United States Patent
Cho et al.

(10) Patent No.: US 12,025,350 B2
(45) Date of Patent: Jul. 2, 2024

(54) GEOTHERMAL SYSTEM COMPRISING MULTITUBE VERTICALLY-SEALED UNDERGROUND HEAT-EXCHANGER AND METHOD FOR INSTALLING SAME

(71) Applicant: G&G TECHNOLOGY CO., LTD., Incheon (KR)

(72) Inventors: Heuy Nam Cho, Incheon (KR); Hyeon Ho Chang, Ansan-si (KR); Sung Ouk Choi, Incheon (KR); Young Hwa Kim, Ansan-si (KR); Jo Bum An, Incheon (KR)

(73) Assignee: G&G TECHNOLOGY CO., LTD., Incheon (KR)

( * ) Notice: Subject to any disclaimer, the term of this patent is extended or adjusted under 35 U.S.C. 154(b) by 146 days.

(21) Appl. No.: 17/774,861

(22) PCT Filed: Apr. 16, 2021

(86) PCT No.: PCT/KR2021/004803
§ 371 (c)(1),
(2) Date: May 6, 2022

(87) PCT Pub. No.: WO2021/210944
PCT Pub. Date: Oct. 21, 2021

(65) Prior Publication Data
US 2022/0397308 A1    Dec. 15, 2022

(30) Foreign Application Priority Data

Apr. 17, 2020 (KR) .......................... 10-2020-0046956

(51) Int. Cl.
*F24T 10/15* (2018.01)
*F24T 10/00* (2018.01)

(52) U.S. Cl.
CPC ........... *F24T 10/15* (2018.05); *F24T 2010/53* (2018.05)

(58) Field of Classification Search
CPC .............................. F24T 10/15; F24T 2010/53
(Continued)

(56) References Cited

U.S. PATENT DOCUMENTS 4,094,356 A * 6/1978 Ash ........................ F24T 10/30
165/45
5,372,016 A   12/1994 Rawlings
(Continued)

FOREIGN PATENT DOCUMENTS

EP    0582118 A1    2/1994
EP    1387130 A1    2/2004
(Continued)

OTHER PUBLICATIONS

International Search Report for PCT/KR2021/004803 dated Jul. 26, 2021 from Korean Intellectual Property Office.
(Continued)

*Primary Examiner* — Claire E Rojohn, III
(74) *Attorney, Agent, or Firm* — Revolution IP, PLLC

(57) ABSTRACT

A geothermal system including a multitube vertically-sealed underground heat-exchanger includes: a geothermal well formed by vertically excavating a foundation; a heat pump which is arranged in the foundation, and which includes a circulating pump; and a connection tube, an auxiliary facility, and a multitube vertically-sealed underground heat-exchanger which are buried and installed in the geothermal well, and which are connected to the heat pump such that a thermal fluid thermally restored in the geothermal well is supplied to the heat pump through the circulating pump, and (Continued)

the thermal fluid that has undergone heat exchange in the heat pump is recovered back to the geothermal well and thermally restored therein.

23 Claims, 22 Drawing Sheets

(58) Field of Classification Search
USPC .......................................................... 165/45
See application file for complete search history.

(56) References Cited

U.S. PATENT DOCUMENTS

| | | | | |
|---|---|---|---|---|
| 6,212,896 | B1 * | 4/2001 | Genung | F24T 10/17 |
| | | | | 165/45 |
| 6,276,438 | B1 * | 8/2001 | Amerman | E21B 33/13 |
| | | | | 166/57 |
| 6,450,247 | B1 * | 9/2002 | Raff | F24F 5/0046 |
| | | | | 165/45 |
| 6,615,601 | B1 * | 9/2003 | Wiggs | F25B 27/005 |
| | | | | 62/235.1 |
| 6,698,976 | B1 * | 3/2004 | Cho | E21B 33/1277 |
| | | | | 175/57 |
| 6,751,974 | B1 * | 6/2004 | Wiggs | F24T 10/10 |
| | | | | 62/260 |
| 7,832,220 | B1 * | 11/2010 | Wiggs | F24T 10/15 |
| | | | | 62/260 |
| 8,769,951 | B2 * | 7/2014 | Nakatani | F03G 7/04 |
| | | | | 165/45 |
| 8,997,509 | B1 * | 4/2015 | Wiggs | F25B 47/022 |
| | | | | 62/278 |
| 9,181,931 | B2 * | 11/2015 | McBay | F24T 10/10 |
| 2013/0025819 | A1 | 1/2013 | Yang | |
| 2014/0262136 | A1 | 9/2014 | Jensen | |

FOREIGN PATENT DOCUMENTS

| | | |
|---|---|---|
| EP | 2738481 A2 | 6/2014 |
| JP | 08-285480 A | 11/1996 |
| JP | 2003-262430 A | 9/2003 |
| JP | 2015-064188 A | 4/2015 |
| JP | 2016-223633 A | 12/2016 |
| JP | 2017-227362 A | 12/2017 |
| JP | 2017227362 A * | 12/2017 |
| JP | 2019-015408 A | 1/2019 |
| KR | 10-0880675 B1 | 1/2009 |
| KR | 10-2009-0128722 A | 12/2009 |
| KR | 10-0958360 B1 | 5/2010 |
| KR | 10-1403041 B1 | 6/2014 |
| KR | 10-2014-0115285 A | 9/2014 |
| WO | 2009-129778 A2 | 10/2009 |
| WO | 2011-083899 A1 | 7/2011 |

OTHER PUBLICATIONS

Extended European Search Report of EP 21789011.0 issued Apr. 15, 2024.

* cited by examiner

GEOTHERMAL SYSTEM COMPRISING MULTITUBE VERTICALLY-SEALED UNDERGROUND HEAT-EXCHANGER AND METHOD FOR INSTALLING SAME

TECHNICAL FIELD

The present invention relates to a geothermal system including a vertical multitubular hermetic underground heat exchanger equipped with a plurality of supply tubes and a plurality of recovery tubes and a method of installing the same.

BACKGROUND ART

Generally, a heat-exchanging structure of a vertical hermetic underground heat exchanger using geothermal heat is constructed such that a plurality of geothermal holes are vertically formed in the ground and a supply tube, a recovery tube and the like are embedded in the geothermal hole so as to obtain geothermal heat from thermal fluid flowing in the supply tube and the recovery tube and to cool or warm the interior of a building using the geothermal heat through a heat pump connected to the supply tube and the recovery tube.

In the vertical hermetic underground heat exchanger, the lower ends of the supply tube and the recovery tube are connected to each other via a "U"-shaped band, and the geothermal hole is formed to a depth of about 150-300 M.

As such a conventional vertical hermetic underground heat exchanger, Korean Patent Registration No. 10-0958360, titled "UNDERGROUND HEAT EXCHANGER USING GEOTHERMAL HEAT" (hereinafter, referred to as a "related technology"), has been proposed.

In conventional vertical hermetic underground heat exchangers as well as the related technology, because only a total of two tubes, that is, a supply tube and a recovery tube are inserted into a geothermal hole and thus a large space is defined in the geothermal hole, there is a problem in that efficiency of heat exchange is deteriorated. Accordingly, there is a need to drill a large number of geothermal holes in order to satisfy the thermal capacity required for smart farms or general buildings, thereby causing a problem in that the amount of area required to install the underground heat exchanger onsite is increased.

For these reasons, a vertical multitubular hermetic underground heat exchanger equipped with three or four tubes have been developed. Based on a fixed amount of input heat in a thermal conduction test, a two-tube-type underground heat exchanger exhibits 50-80 W/m while a four-tube-type underground heat exchanger exhibits 65-105 W/m. From the results of the test, it was found that the heat exchange capacity per square meter is greatly increased. Consequently, it was possible to reduce the possibility of reducing the required number of geothermal holes and to reduce the installation area.

Such a conventional vertical multitubular hermetic underground heat exchanger is constructed such that the lower ends of a supply tube and a recovery tube are connected to each other via two "U"-shaped bands and a plurality of supply tubes and a plurality of recovery tubes are provided. Hence, because the supply tubes and the recovery tubes easily float even when installed at a shallow depth due to the buoyancy, which is increased in proportion to the increase in volume per unit length, there is a problem in that an underground heat exchanger cannot be constructed in a general geothermal system including an underground heat exchanger.

In addition, because it is impossible to check a vertical multitubular hermetic underground heat exchanger after the underground heat exchanger is installed in a geothermal hole, there is a problem in that the underground heat exchanger must be shut down when leakage of circulating thermal fluid occurs.

DISCLOSURE

Technical Problem

Therefore, the present invention has been made in view of the above problems, and it is an object of the present invention to provide a geothermal system including a vertical multitubular hermetic underground heat exchanger, which is capable of preventing floatation of supply tubes and recovery tubes due to increased buoyance caused by an increased volume resulting from increased numbers of supply tubes and recovery tubes, and a method of installing the same.

It is another object of the present invention to provide a geothermal system including a vertical multitubular hermetic underground heat exchanger, which enables the underground heat exchanger to be checked even after installation in a geothermal hole, and a method of installing the same.

Technical Solution

In accordance with an aspect of the present invention, the above and other objects can be accomplished by the provision of a geothermal system including a vertical multitubular hermetic underground heat exchanger including a geothermal hole vertically drilled in the ground, a heat pump disposed on the ground and including a circulation pump, and the vertical multitubular hermetic underground heat exchanger embedded in the geothermal hole and connected to the heat pump so as to supply thermal fluid, which has absorbed heat in the geothermal hole, to the heat pump via the circulation pump and to recover the thermal fluid, which has exchanged heat in the heat pump, to the geothermal hole, the vertical multitubular hermetic underground heat exchanger including a connection tube (not shown) and associated components, wherein the vertical multitubular hermetic underground heat exchanger includes a recovery header unit disposed underneath the geothermal hole, a recovery unit comprising an outflow tube connected to the heat pump so as to allow the thermal fluid, which has exchanged heat in the heat pump, to flow therethrough from the heat pump, a recovery connection tube having openings respectively formed in a lower portion and a side portion thereof and connected at the side portion thereof to the outflow tube, a distribution tube having one opening formed in an upper portion thereof and one or more openings formed in a lower portion thereof and connected at an upper portion thereof to the lower portion of the recovery connection tube, and two or more recovery tubes embedded in the geothermal hole and connected at an upper end thereof to the lower portion of the distribution tube and at a lower end thereof to the recovery header unit such that the thermal fluid outflowing from the outflow tube is recovered to the recovery header unit while absorbing heat, a supply unit comprising an inflow tube connected to the heat pump, a supply connection tube having openings respectively formed in a lower portion and a side portion thereof and connected at the side portion thereof to the inflow tube, an interflow tube having one opening formed in an upper portion thereof and one or more openings formed in a lower portion thereof and connected at the upper portion thereof to the lower portion of the supply connection tube, and two or more supply tube embedded in the geothermal hole and connected at an upper end thereof to the lower portion of the interflow tube and at a lower end thereof to the recovery header unit such that the thermal fluid recovered to the recovery header unit is supplied to the heat pump through the interflow tube, the supply connection tube, and the inflow tube while absorbing heat, and a load bar coupled both to the recovery tube and to the supply tube, wherein the recovery header unit has an internal space in which the recovery tubes are connected to respective supply tubes such that the thermal fluid recovered through the recovery tubes merges and is distributed to the supply tubes by changing a direction of flow, the internal space being curved at a lower portion thereof such that the thermal fluid recovered from the recovery tubes is smoothly transferred to the supply tubes, and wherein the load bar is fixed to the recovery tubes and the supply tubes by means of a fixing member so as to space the recovery tubes and the supply tubes apart from one another, and includes a metal member therein to prevent floatation of the recovery tubes and the supply tubes.

The geothermal system may further include checking units respectively mounted on upper portions of the recovery connection tube and the supply connection tube, each having an opening formed in an upper portion thereof, and a cover configured to hermetically close an upper portion of the geothermal hole to thus prevent entry of foreign substances into the geothermal hole.

The side portion of the recovery connection tube may be connected to the inflow tube and the side portion of the supply connection tube may be connected to the outflow tube such that the function of the recovery tubes is replaced with the function of the supply tubes.

The recovery header unit may include an upper header and a lower header, the upper header and the lower header being fused to each other by heat in a butt-welding manner.

The recovery header unit may include a plurality of sockets disposed in an upper portion of an inside thereof.

Each of the sockets may be internally provided with a heating wire, and the recovery tubes and the supply tubes may be respectively inserted into the plurality of sockets and fused thereto by heat.

Each of the plurality of sockets may include a support protective ring including the heating wire therein and fixedly inserted thereinto, and the recovery tubes and the supply tubes may be respectively inserted into the support protective rings and fused thereto by heat.

The recovery header unit may include a plurality of thermal fusion sockets projecting upwards from an upper portion thereof, and the recovery tubes and the supply tubes may be melted at outer circumferential surfaces of lower ends thereof and may be fused to the plurality of thermal fusion sockets by heat.

Each of the plurality of thermal fusion sockets may include a support ring fitted thereover so as to prevent deformation of the thermal fusion socket.

The recovery tubes may include a first recovery tube and a second recovery tube, and the supply tubes may include a first supply tube and a second supply tube.

The recovery tubes may further include a converging tube, connected to lower ends of the first recovery tube and the second recovery tube, and a third recovery tube, connected to a lower end of the converging tube and connected at a lower end thereof to the recovery header unit, and the supply tubes may further include a diverging tube connected to lower ends of the first supply tube and the second supply tube, and a third supply tube, connected to a lower end of the diverging tube and connected at a lower end thereof to the recovery header unit.

The first and second recovery tubes and the first and second supply tubes may have a same outside diameter and a same inside diameter.

The first recovery tube may have an outside diameter and an inside diameter greater than the second recovery tube, the first supply tube may have an outside diameter and an inside diameter greater than those of the second supply tube, the first recovery tube and the first supply tube may have the same outside diameter and the same inside diameter, and the second recovery tube and the second supply tube may have the same outside diameter and the same inside diameter.

The geothermal system may further include a weight mounted on the lower portion of the recovery header unit so as to prevent floatation of the recovery header unit.

The load bar may be disposed between the recovery tubes and the supply tubes so as to space the recovery tubes and the supply tubes apart from one another, and may include a metal member therein, and the fixing member may fix the load bar to the recovery tubes and the supply tubes.

The load bar may include an adhesive band provided on the outer surface thereof so as to attach the load bar to the recovery tubes and the supply tubes.

Each of the supply unit and the recovery unit may include a marker indicating the direction in which the thermal fluid flows.

The geothermal system may further include an injection pump connected to a water tank so as to supply water to the geothermal hole.

The geothermal system may further include a cement tremie tube, inserted into the geothermal hole and connected at an upper portion thereof to a cement injection pump so as to supply a grout material containing cement to a lower portion of an inside of the geothermal hole, and a bentonite tremie tube, inserted into the geothermal hole and connected at an upper portion thereof to a bentonite injection pump so as to supply a grout material containing bentonite to an upper portion of the inside of the geothermal hole, wherein the grout material containing cement may include a waterproofing agent in order to prevent the thermal fluid from leaking outside the recovery tubes and the supply tubes when the thermal fluid leaks from the recovery header unit.

In accordance with another aspect of the present invention, the above and other objects can be accomplished by the provision of a method of installing the geothermal system including a vertical multitubular hermetic underground heat exchanger including a first operation of vertically drilling the ground to form a geothermal hole, a second operation of disposing two or more recovery tube injectors and two or more supply tube injectors on the ground, a third operation of coupling the recovery header unit to lower ends of the recovery tubes running from the recovery tube injectors and to lower ends of the supply tubes running from the supply tube injectors, a fourth operation of fixing the load bar to the recovery tubes and the supply tubes, injecting the recovery tubes into the geothermal hole from the recovery tube injectors while injecting the supply tubes into the geothermal hole from the supply tube injectors in order to dispose the recovery header unit at a lower portion of the geothermal hole, and disposing the cement tremie tube and/or the bentonite tremie tube in the geothermal hole, a fifth operation of mounting valves on upper ends of the recovery tubes and the supply tubes and charging clean water into the recovery tubes and the supply tubes through the valves in order to prevent constriction of the recovery tubes and the supply tubes, a sixth operation of supplying the grout material containing cement to the lower portion of the inside of the geothermal hole through the cement tremie tube and supplying the grout material containing bentonite to the upper portion of the inside of the geothermal hole through the bentonite tremie tube, and a seventh operation of removing the valves from the upper ends of the recovery tubes and the supply tubes, connecting the distribution tube to the upper ends of the recovery tubes, connecting the recovery connection tube to the distribution tube, connecting the outflow tube to the recovery connection tube, connecting the interflow tube to the upper ends of the supply tubes, connecting the supply connection tube to the interflow tube, connecting the inflow tube to the supply connection tube, and connecting the outflow tube and the inflow tube to the heat pump.

The seventh operation may include mounting checking units on upper portions of the recovery connection tube and the supply connection tube.

The third operation may include mounting a weight to a lower portion of the recovery header unit in order to prevent floatation of the recovery header unit.

The cement tremie tube and the bentonite tremie tube may be constructed so as to have the same configuration, and the sixth operation may include supplying the grout material containing cement to the lower portion of the inside of the geothermal hole through the cement tremie tube and supplying the grout material containing bentonite to the upper portion of the inside of the geothermal hole through the cement tremie tube.

Advantageous Effects

The present invention conveys the following effects.

First, because the number of supply tubes and recovery tubes is increased and thus a heat exchange area is increased compared to a conventional underground heat exchanger which includes a single supply tube and a single recovery tube, it is possible to improve efficiency of heat exchange of the underground heat exchanger.

In other words, in comparison with a conventional underground heat exchanger installed at the same depth, because the capacity of underground heat exchange per square meter is increased, it is possible to reduce the number of geothermal holes for a required capacity. As a result, there are effects of reducing the installation area, the expense incurred to drill the geothermal hole, and the expense incurred to install the underground heat exchanger, thereby realizing economical installation.

Furthermore, because the weight is mounted on the recovery header unit, it is possible to prevent floatation of the recovery header unit and the recovery tubes and the supply tubes connected to recovery header unit. In addition, the load bar is disposed between the recovery tubes and the supply tubes and is fixed thereto by means of the fixing member, it is also possible to prevent floatation of the recovery tubes and the supply tubes by means of the load bar and the fixing member.

Accordingly, because the underground heat exchanger is capable of being installed at a depth of 300 m or more, it is possible to ensure a large amount of heat capacity by a small number of geothermal holes when an installation area is small as in a smart farm, a glasshouse or a downtown building which is constructed in a large scale in a limited area, thereby conveying an effect of greatly enhancing availability of a space in gardening facility or a building site.

In addition, because the checking units are respectively mounted to the upper portions of the recovery connection tube and the supply connection tube, it is possible to check the vertical multitubular hermetic underground heat exchanger after the underground heat exchanger is installed in the geothermal hole. Consequently, because it is possible to separately check for accidental spillage at every geothermal hole, it is possible to preemptively prevent shutdown of the entire facility due to accidental spillage.

DESCRIPTION OF REFERENCE NUMERALS

Figure 1:
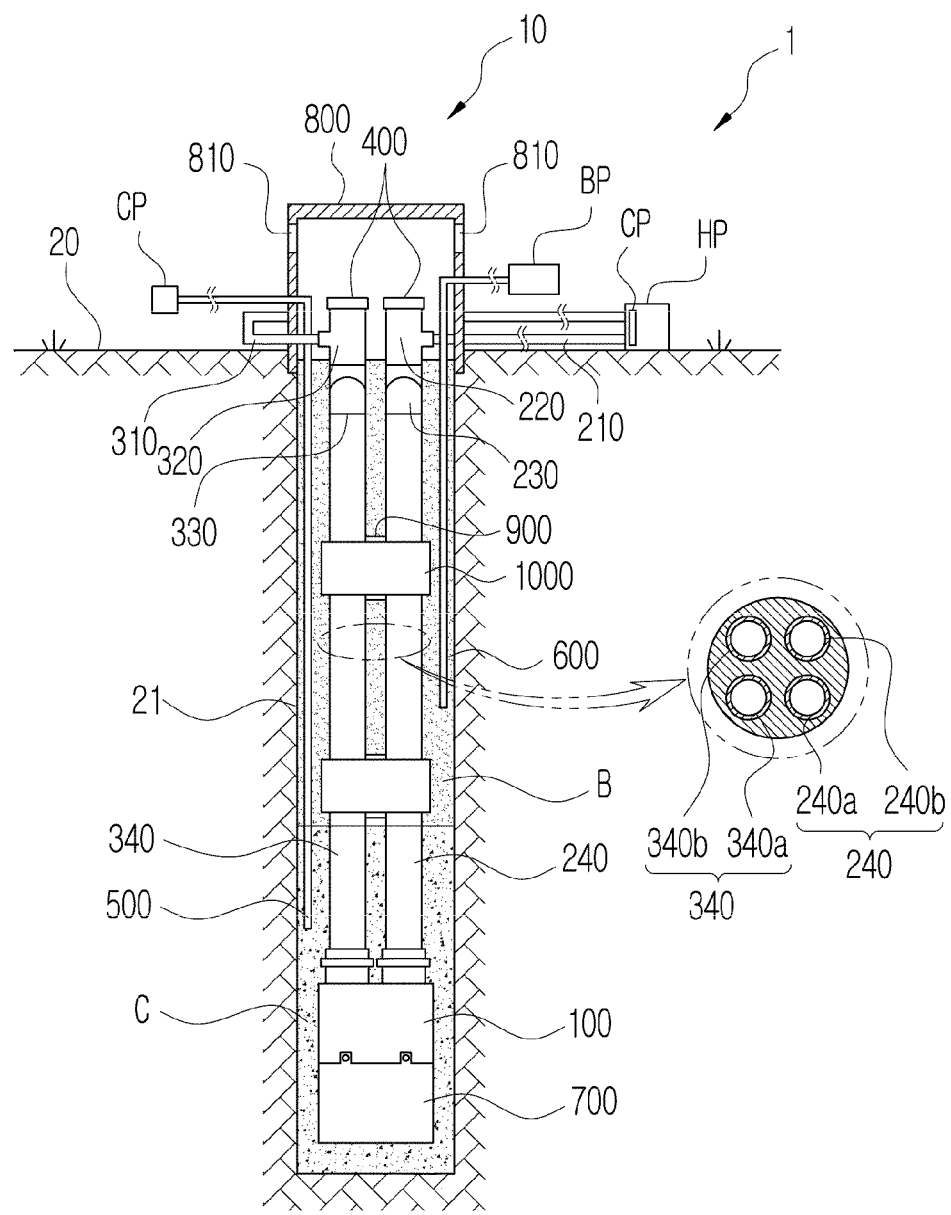
FIG. 1 illustrates a geothermal system including a vertical multitubular hermetic underground heat exchanger according to the present invention.

10: vertical multitubular hermetic underground heat exchanger
100: recovery header unit 200: recovery unit 210: outflow tube 220: recovery connection tube 230: distribution tube
240: recovery tube 240a: first recovery tube 240b: second recovery tube
300: supply unit 310: inflow tube 320: supply connection tube 330: interflow tube 340: supply tube
340a: first supply tube 340b: second supply tube
400: checking unit 500: cement tremie tube 600: bentonite tremie tube
700: weight 800: cover 900: load bar 1000: fixing member
20: ground 21: geothermal hole HP: heat pump CP: circulation pump WP: injection pump

BEST MODE

Hereinafter, preferred embodiments of the present invention will be described in detail with reference to the accompanying drawings. Herein, descriptions of known technologies are given briefly or omitted for brevity of explanation.

A geothermal system 1 including a vertical multitubular hermetic underground heat exchanger 10 may include a geothermal hole 21 vertically formed in the ground 20, a heat pump HP disposed on the ground 20 and including a circulation pump CP, and the vertical multitubular hermetic underground heat exchanger 10, which is embedded in the geothermal hole 21 and is connected to the heat pump HP so as to supply thermal fluid, which has absorbed heat in the geothermal hole 21, to the heat pump HP and to recover the thermal fluid, which has exchanged heat in the heat pump HP, to the geothermal hole 21, the vertical multitubular hermetic underground heat exchanger 10 including a connection tube (not shown) and associated components.

Here, the circulation pump CP may be mounted inside or outside the heat pump HP so as to circulate the thermal fluid, which has exchanged heat in the heat pump HP.

Referring to FIGS. 1 to 13, FIG. 15, and FIG. 17, the vertical multitubular hermetic underground heat exchanger 10 may include a recovery header unit 100, a recovery unit 200, a supply unit 300, a checking unit 400, a cement tremie tube 500, a bentonite tremie tube 600, a weight 700, and a cover 800.

Figure 2:
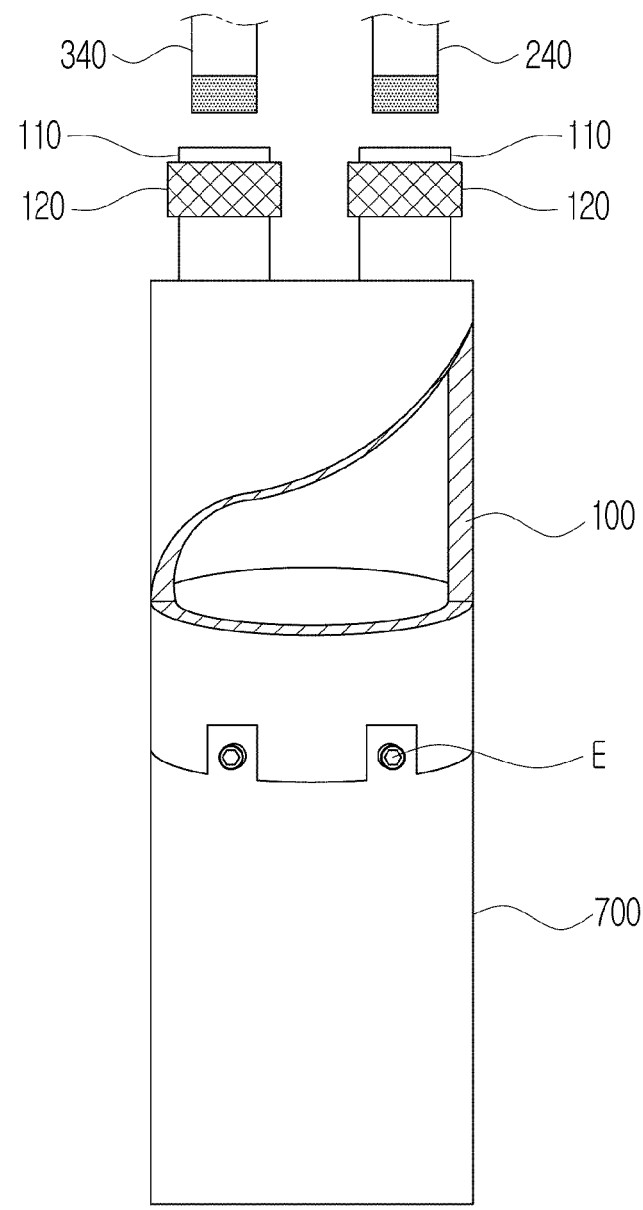
FIG. 2 illustrates a recovery header unit of the geothermal system including the vertical multitubular hermetic underground heat exchanger according to the present invention.

Referring to FIGS. 1 and 2, the recovery header unit 100 may be disposed underneath the geothermal hole 21.

The recovery header unit 100 may be constructed to serve as a functional boundary at which supply tubes 340 of the supply unit 300 are connected to recovery tubes 240 of the recovery unit 200.

The recovery header unit 100 may have an internal space 100s defined therein.

Figure 3:
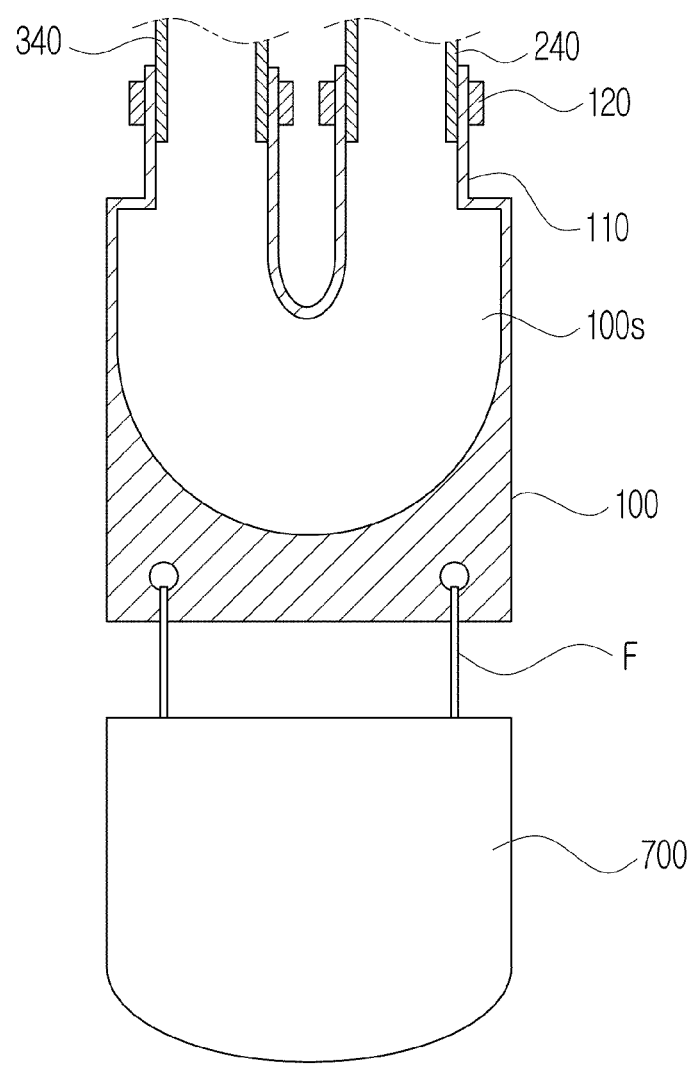
FIG. 3 illustrates the recovery header unit of the geothermal system including the vertical multitubular hermetic underground heat exchanger according to the present invention.

Referring to FIG. 3, the internal space 100s in the recovery header unit 100 may be curved at the lower portion thereof so as to allow the thermal fluid, which is recovered from the recovery unit 200, to be smoothly transmitted to the supply unit 300 by changing the direction of flow of the thermal fluid.

The internal space 100s in the recovery header unit 100 may be filled with the thermal fluid, which is recovered from the recovery tubes 240 connected to the upper portion of the recovery header unit 100, and the thermal fluid charged in the internal space 100s may be supplied to the supply tubes 340 connected to the upper portion of the recovery header unit 100.

Figure 19:
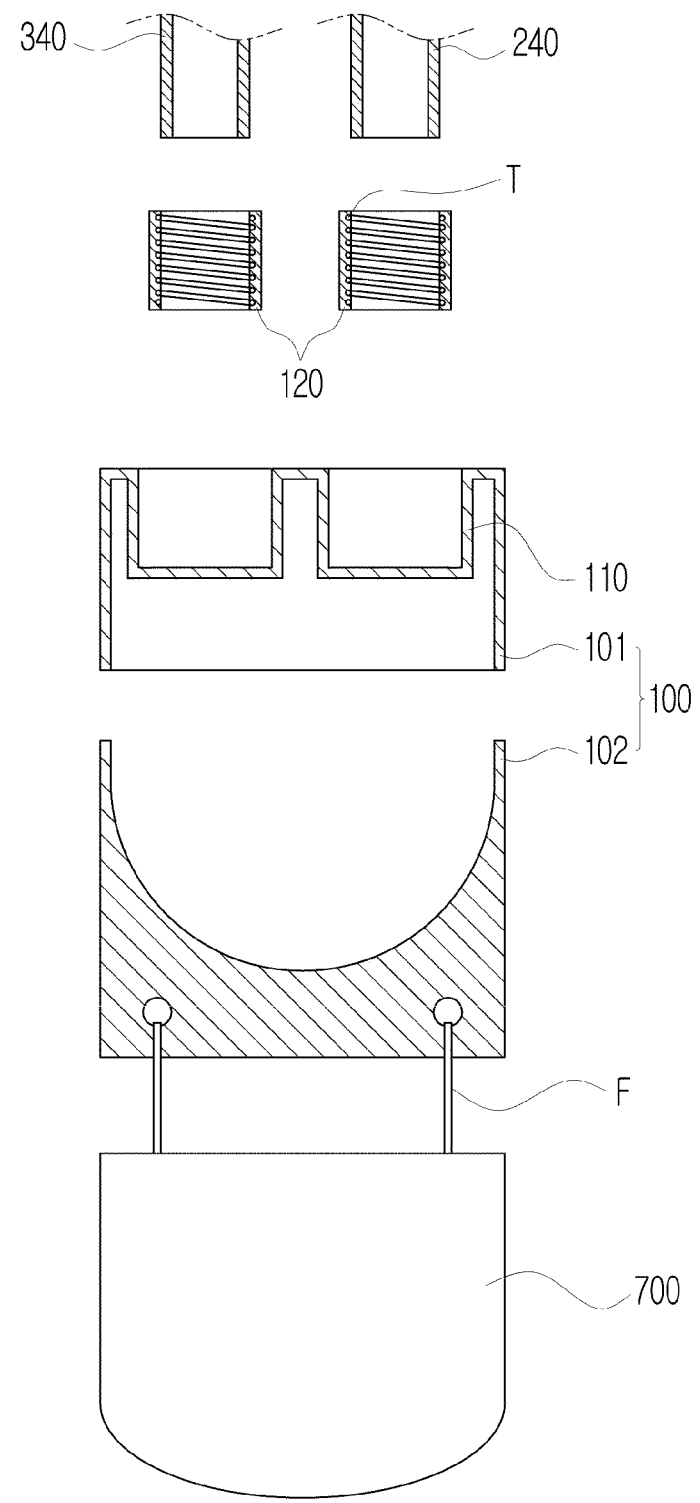
FIG. 19 illustrates the recovery header unit of the geothermal system including the vertical multitubular hermetic underground heat exchanger according to the present invention.

Referring to FIG. 19, the recovery header unit 100 may include an upper header 101 and a lower header 102, which are fused to each other using heat in a butt-welding manner.

Figure 18:
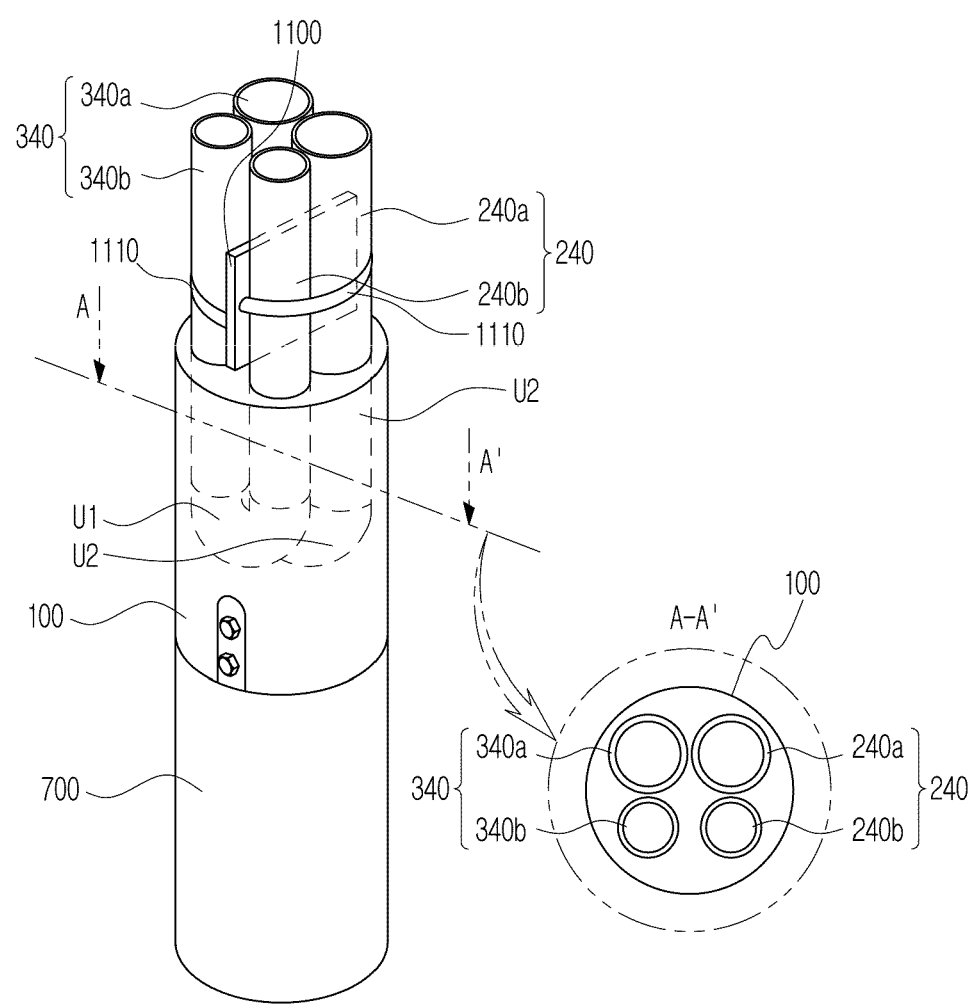
FIG. 18 illustrates the recovery header unit of the geothermal system including the vertical multitubular hermetic underground heat exchanger according to the present invention, which is composed of a first "U"-shaped band and a second "U"-shaped band.

As additionally illustrated in FIG. 18, the recovery tubes 240 may include a first recovery tube 240a and a second recovery tube 240b, and the supply tubes 340 may include a first supply tube 340a and a second supply tube 340b.

Figure 21:
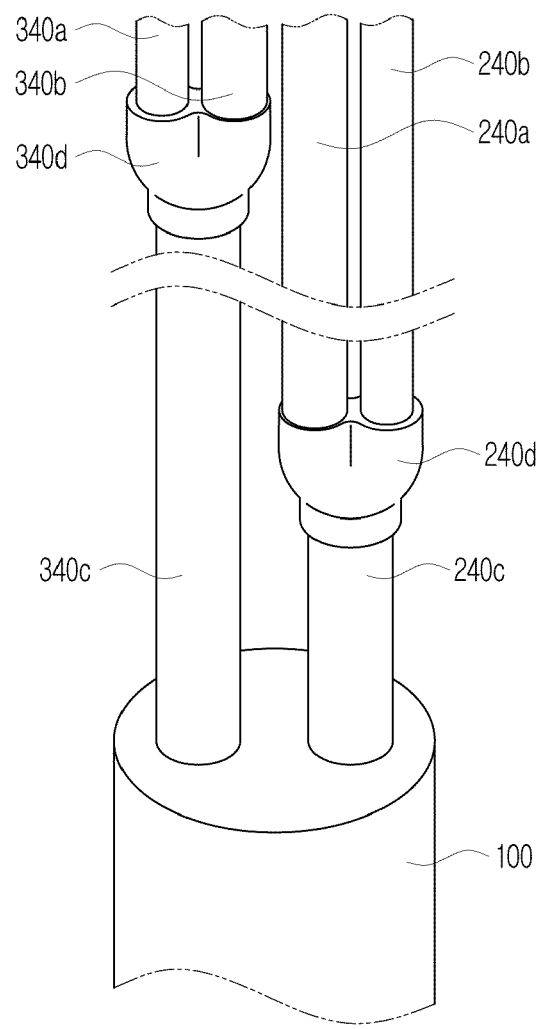
FIG. 21 illustrates the recovery tubes and the supply tubes of the geothermal system including the vertical multitubular hermetic underground heat exchanger according to the present invention.

Further referring to FIG. 21, the recovery tubes 240 may further include a converging tube 240d connected both to the lower end of the first recovery tube 240a and the lower end of the second recovery tube 240b, and a third recovery tube 240c, which is connected at the upper end thereof to the lower end of the converging tube 240d and at the lower end thereof to the recovery header unit 100. The supply tubes 340 may further include a diverging tube 340d connected both to the lower end of the first supply tube 340a and to the lower end of the second supply tube 340b, and a third supply tube 340c, which is connected at the upper end thereof to the lower end of the diverging tube 340d and at the lower end thereof to the recovery header unit 100.

Here, the converging tube 240d may be composed of a "Y"-shaped tube, and may be connected at the upper end thereof both to the lower end of the first recovery tube 240a and to the lower end of the second recovery tube 240b and at the lower end thereof to the upper end of the third recovery tube 240c, which is connected to the recover header 100. Consequently, because the number of connection tubes is lower than in the case in which the first recovery tube 240a and the second recovery tube 240b are connected to the recover header 100, it is possible to easily perform a connection operation.

Here, the diverging tube 340d may be composed of a "Y"-shaped tube, and may be connected at the upper end thereof both to the lower end of the first supply tube 340a and to the lower end of the second supply tube 340b and at the lower end thereof to the upper end of the third supply tube 340c, which is connected to the recover header 100. Consequently, because the number of connection tubes is lower than in the case in which the first supply tube 340a and the second supply tube 340b are connected to the recover header 100, it is possible to easily perform a connection operation.

Furthermore, the converging tube 240d and the diverging tube 340d may be disposed at different levels so as to allow the tubes to be easily inserted into the geothermal hole 21 even when the geothermal hole 21 has a small diameter.

Alternatively, each of the converging tube 240d and the diverging tube 340d may be composed at one end thereof of an elbow tube and at the other end thereof of a "T"-shaped tube so as to convey the same effect.

Referring to FIG. 18, the first recovery tube 240a may have outside and inside diameters larger than those of the second recovery tube 240b, and the first supply tube 340a may have outside and inside diameters larger than those of the second supply tube 340b. The first recovery tube 240a and the first supply tube 340a may have the same outside and inside diameters, and the second recovery tube 240b and the second supply tube 340b may have the same outside and inside diameters. Here, a second "U"-shaped band U2 has a radius of curvature larger than that of a first "U"-shaped band U1. The recovery header unit 100 may firmly couple the first "U"-shaped band U1 to the lower portions of the first recovery tube 240a and the first supply tube 340a, and may firmly couple the second "U"-shaped band U2 to the lower portions of the second recovery tube 240b and the second supply tube 340b. Preferably, epoxy, urethane or cement may be externally applied to the "U"-shaped band and the tubes so as to integrally form the two components.

Alternatively, the first and second recovery tubes 240a and 240b and the first and second supply tubes 340a and 340b may have the same diameter, and the first "U"-shaped band U1 and the second "U"-shaped band U2 may have the same diameter. Furthermore, the first and second recovery tubes 240a and 240b, the first and second supply tubes 340a and 340b, and the first and second "U"-shaped bands U1 and U2 may be fixedly inserted into a tube body constituting the recovery header unit 100 so as to realize a more simplified recovery header unit 100.

Figure 5:
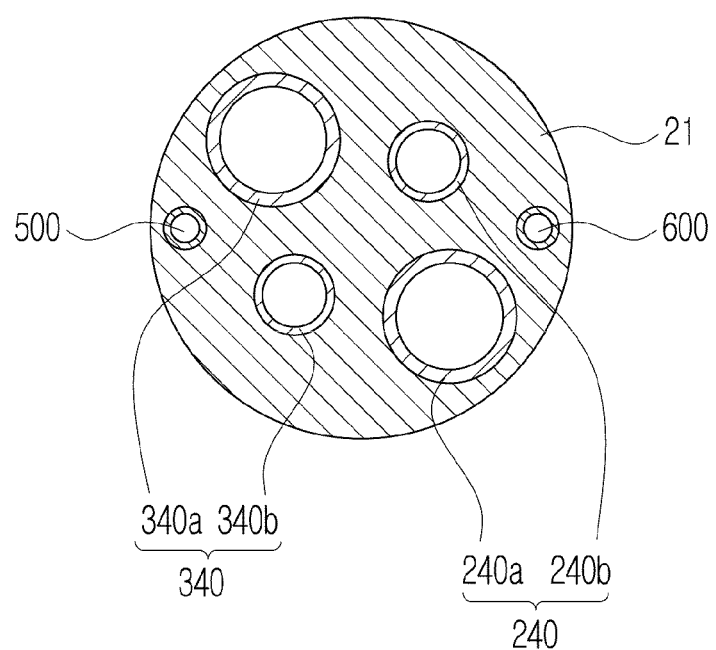
FIG. 5 illustrates the recovery tubes and the supply tubes of the geothermal system including the vertical multitubular hermetic underground heat exchanger according to the present invention.

Referring to FIG. 5, the recovery tubes 240 may be composed of the first recovery tube 240a and the second recovery tube 240b, and the supply tubes 340 may be composed of the first supply tube 340a and the second supply tube 340b. The first recovery tube 240a may have outside and inside diameters larger than those of the second recovery tube 240b, and the first supply tube 340a may have outside and inside diameters larger than those of the second supply tube 340b. The first recovery tube 240a and the first supply tube 340a may have the same outside and inside diameters, and the second recovery tube 240b and the second supply tube 340b may have the same outside and inside diameters. In the drawing, the first recovery tube 240a may be disposed at a right and lower side, and the second recovery tube 240b may be disposed at a right and upper side. Furthermore, the first supply tube 340a may be disposed at a left and upper side, and the second supply tube 340b may be disposed at a left and lower side. As a result, the first and second recovery tubes 240a and 240b and the first and second supply tubes 340a and 340b may be symmetrically disposed about the center of the geothermal hole 21 such that sufficient space is provided around each of the second recovery tube 240b and the second supply tube 340b. Consequently, it is possible to easily mount the vertical multitubular hermetic underground heat exchanger 10 even when the geothermal hole 21 has a narrow portion.

Figure 6:
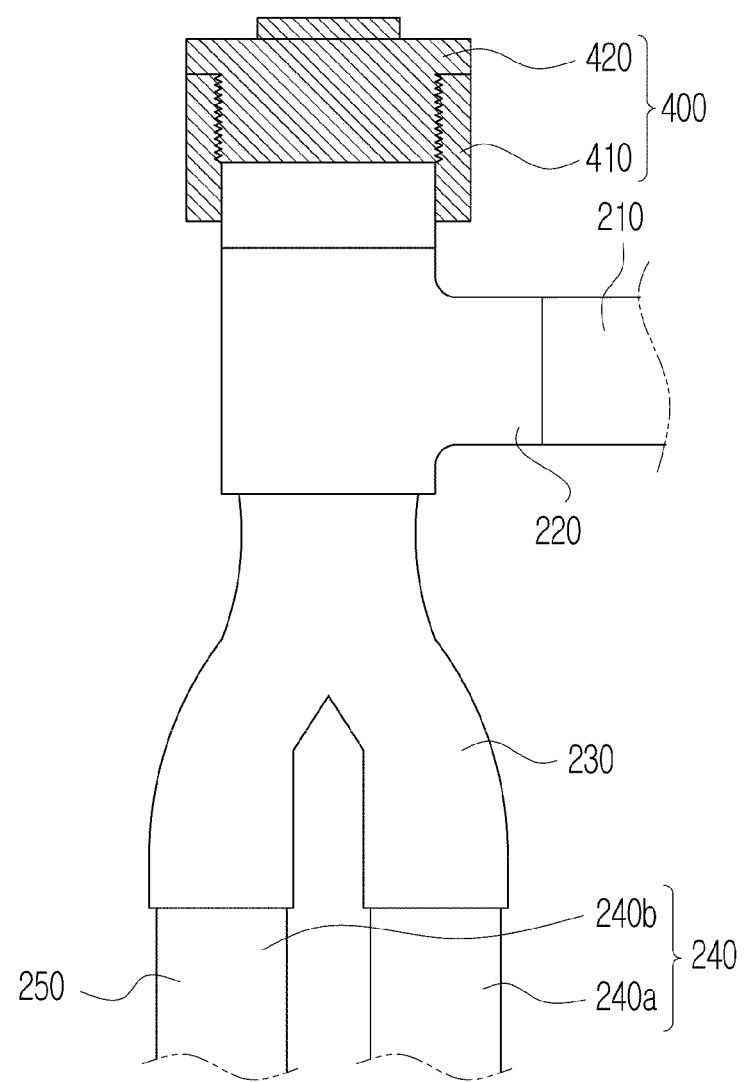
FIG. 6 illustrates a recovery unit of the geothermal system including the vertical multitubular hermetic underground heat exchanger according to the present invention.

Referring to FIGS. 1 and 6, the recovery unit 200 may include an outflow tube 210, which is connected to the heat pump HP and through which the thermal fluid, which has exchanged heat in the heat pump HP, flows out, a recovery connection tube 220, which has an opening formed in the lower portion thereof and an opening formed in a side portion thereof and which is connected at the side portion thereof to the outflow tube 210, a distribution tube 230, which has an opening formed in the upper portion thereof and two or more openings formed in the lower portion thereof and which is connected at the upper portion thereof to the lower portion of the recovery connection tube 220, and the recovery tubes 240, which are embedded in the geothermal hole 21 and which are connected at the upper ends thereof to the lower portion of the distribution tube 230 and at the lower ends thereof to the recovery header unit 100 such that the thermal fluid that flows into the outflow tube 210 is recovered to the recovery header unit 100 and absorbs heat therein.

Here, the recovery connection tube 220 may have an opening formed in the upper portion thereof, and the checking unit 400 may be mounted in the upper portion of the recovery connection tube 220.

The opening formed in the upper portion of the distribution tube 230 may have an area greater than the total area of the two openings formed in the lower portion of the distribution tube 230 such that the rate of flow of the fluid that is introduced into the opening formed in the upper portion of the distribution tube 230 is equal to the rate of flow of the fluid that is discharged from the two opening formed in the lower portion of the distribution tube 230.

To summarize, the recovery unit 200 may be connected both to the heat pump HP and to the recovery header unit 100 so as to recover the thermal fluid, which has exchanged heat in the heat pump HP, to the recovery header unit 100. The thermal fluid absorbs heat in the geothermal hole 21 while flowing to the recovery header unit 100 from the heat pump HP.

Referring to FIG. 1, the supply unit 300 may include an inflow tube 310 connected to the heat pump HP, a supply connection tube 320, which has an opening formed in the lower portion thereof and an opening formed in a side portion thereof and which is connected at the side portion thereof to the inflow tube 310, an interflow tube 330, which has an opening formed in the upper portion thereof and one or more openings formed in the lower portion thereof and which is connected at the upper portion thereof to the lower portion of the supply connection tube 320, and the supply tubes 340, which are embedded in the geothermal hole 21 and which are connected at upper ends thereof to the lower portion of the interflow tube 330 and at lower ends thereof to the recovery header unit such that the thermal fluid that is recovered to the recovery header unit 100 is supplied to the heat pump HP through the interflow tube 330, the supply connection tube 320, and the inflow tube 310 while absorbing heat.

Here, the supply connection tube 320 may have an opening formed in the upper portion thereof, and the checking unit 400 may be mounted in the upper portion of the supply connection tube 320.

The opening formed in the upper portion of the interflow tube 330 may have an area greater than the total area of the two openings formed in the lower portion of the interflow tube 330 such that the rate of flow of the fluid that is introduced into the opening formed in the upper portion of the interflow tube 330 is equal to the rate of flow of the fluid that is discharged from the two openings formed in the lower portion of the interflow tube 330.

To summarize, the supply unit 300 may be connected both to the recovery header unit 100 and to the heat pump HP so as to supply the thermal fluid to the heat pump HP from the recovery header unit 100, and the thermal fluid may absorb heat while flowing to the heat pump HP from the recovery header unit 100.

The inflow tube 310, the supply connection tube 320, the interflow tube 330, and the supply tube 340 of the supply unit 300 may be configured so as to respectively correspond to the outflow tube 210, the recovery connection tube 220, the distribution tube 230, and the recovery tube 240 of the recovery unit 200.

Referring to FIG. 2, the outer surfaces of the lower end of the recovery tube 240 and the supply tubes 340 are melted, and the inner surfaces of thermal fusion sockets 110 projecting upwards from the upper portion of the recovery header unit 100 are melted. Subsequently, the melted outer surfaces of the lower ends of the recovery tubes 240 and the supply tubes 340 are forcibly fitted into the thermal fusion sockets 110 for thermal fusion therebetween. Support rings 120 may be fitted over the outer surfaces of the thermal fusion sockets 110 of the recovery header unit 100 so as to prevent deformation of the thermal fusion sockets 110.

Alternatively, the cut surfaces of the lower ends of the recovery tubes 240 and the supply tubes 340 may be thermally fused to the thermal fusion sockets 110 provided at the upper portion of the recovery header unit 100 in a butt-welding manner. Furthermore, the cut surfaces of the lower ends of the recovery tubes 240 and the supply tubes 340 may be thermally fused to the first and second "U"-shaped bands U1 and U2.

In this case, the thermal fusion sockets 110 may be considered to be formed at the recovery header unit 100 and to include the first and second "U"-shaped bands U1 and U2, which are respectively coupled to the recovery tubes 240 and the supply tubes 340.

Figure 11:
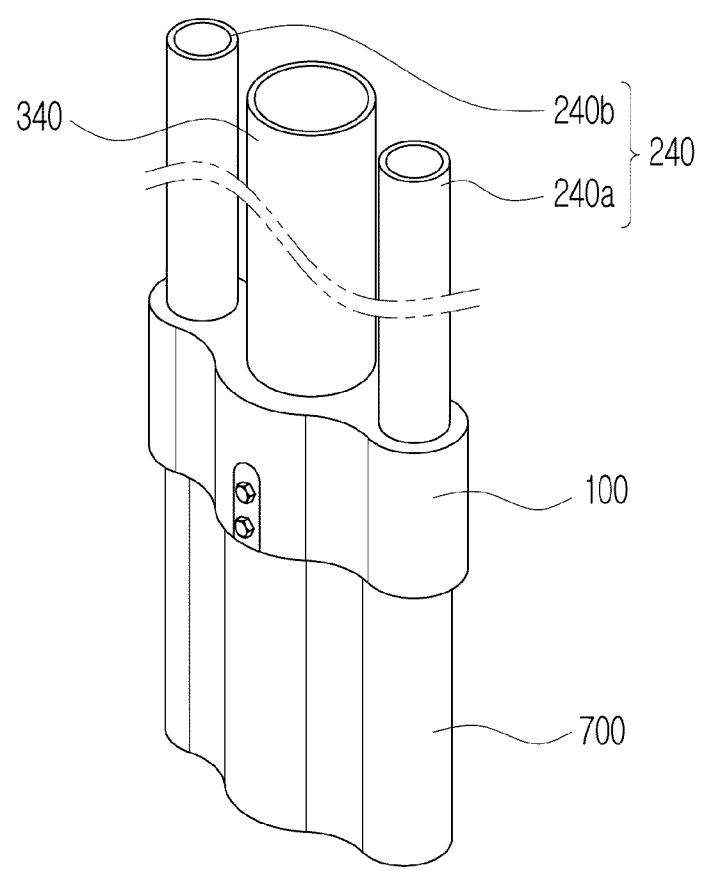
FIG. 11 illustrates the recovery tubes, the supply tubes, and the recovery header unit of the geothermal system including the vertical multitubular hermetic underground heat exchanger according to the present invention.

Alternatively, the supply tubes 340 of the supply unit 300 may be embodied as a single supply tube 340, and the recovery tubes 240 of the recovery unit 200 may be composed of the first and second recovery tubes 240a and 240b, as illustrated in FIG. 11.

Alternatively, the supply tubes 340 may be composed of two or more supply tubes, which are coupled to the recovery header unit 100.

Alternatively, the configuration of the supply tubes 340 may be replaced with the configuration of the first and second recovery tubes 240a and 240 such that the supply unit 300 performs the function of the recovery unit 200 while the recovery unit 200 performs the function of the supply unit 300.

In other words, the side portion of the recovery connection tube 220 may be connected to the inflow tube 310 and the side portion of the supply connection tube 320 may be connected to the outflow tube 210 such that the function of the recovery tube 240 is exchanged with the function of the supply tube 340.

Consequently, the recovery header unit 100 may be constructed so as to serve as the functional boundary at which the supply tubes 340 are connected to the recovery tube 240.

Figure 20:
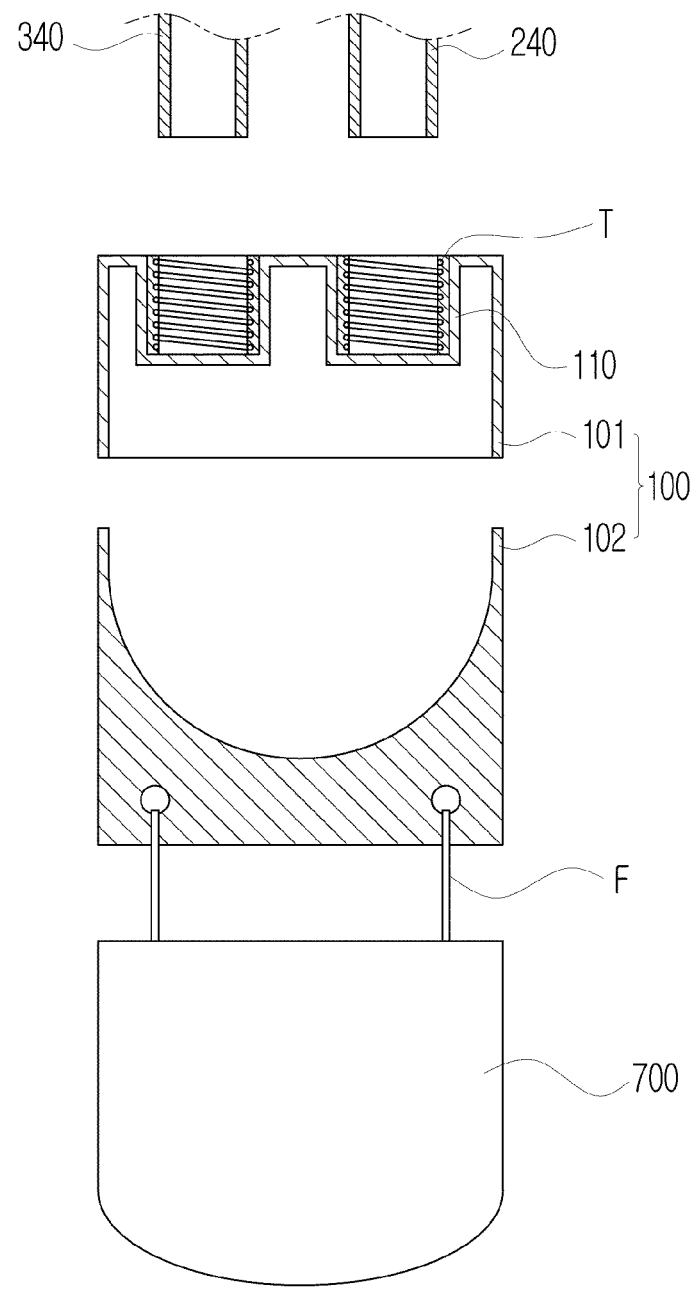
FIG. 20 illustrates the recovery header unit of the geothermal system including the vertical multitubular hermetic underground heat exchanger according to the present invention.

Referring to FIGS. 19 and 20, the recovery header unit 100 may be internally provided at the upper portion thereof with a plurality of socket portions 110'.

The reason why the socket portions 110' are internally provided at the upper portion of the recovery header unit 100 is because the case in which the socket portion 110' are internally provided occupies a small space compared to the case in which the socket portions 110' project outwards from the recovery header unit 100 when the recovery header unit 100 is inserted into the geothermal hole 21, which has a small diameter, thereby allowing the recovery header unit 100 to be easily inserted into the geothermal hole 21.

The socket portions 110' may be internally provided with heating wires T, and the recovery tubes 240 and the supply tubes 340 may be respectively inserted into the socket portions 110' so as to be fused to the socket portions 110' using heat.

Alternatively, the socket portions 110' may be internally provided therein with support protective rings 120' each including a heating wire T embedded therein, and the recovery tubes 240 and the supply tubes 340 may be respectively inserted into the support protective rings 120' so as to be fused thereto using heat.

The checking unit 400 may include a pair of checking units, which are respectively mounted on the upper portions of the recovery connection tube 220 and the supply connection tube 320.

Referring to FIG. 6, the checking unit 400 may include a checking socket 410, which is internally formed with a thread and is provided at the opening formed in the upper portion of the recovery connection tube 220 or the supply connection tube 320, and a checking plug 420, which is threadedly engaged with the checking socket 410 so as to seal the checking socket 410. Accordingly, when there is a need for a worker to check the underground heat exchanger 10, it is possible to check the vertical multitubular hermetic underground heat exchanger 10 by releasing the checking plug 420.

Consequently, because it is possible to perform checking after the vertical multitubular hermetic underground heat exchanger 10 is mounted in the geothermal hole 21 and it is possible to separately check the geothermal holes 21 for accidental spillage to thus respond to the accidental spillage, it is possible to prevent shutdown of the entire facility due to accidental spillage.

Figure 17:
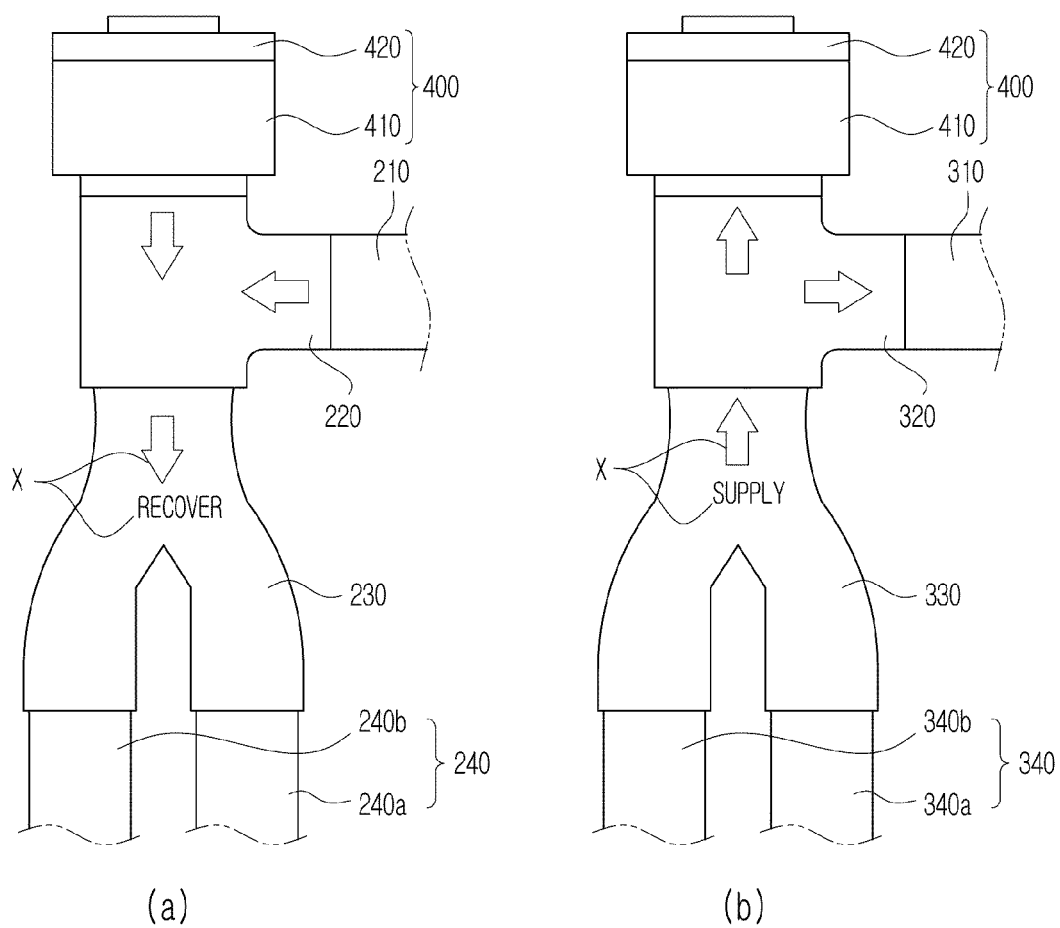
FIG. 17 illustrates the recovery unit and the supply unit of the geothermal system including the vertical multitubular hermetic underground heat exchanger according to the present invention.

Referring to FIG. 17, each of the supply unit 300 and the recovery unit 200 may be provided with a marker X, such as an upward, downward, rightward, or leftward arrow which indicates the direction in which the thermal fluid flows. Furthermore, each of the supply unit 300 and the recovery unit 200 may be provided with a marker X, which indicates the supply unit or the recovery unit using a different color and distinguishes the functions of supply and recovery from each other so as to prevent the supply unit 300 and the recovery unit 200 from being connected to each other in reverse.

The cement tremie tube 500 may be inserted in the geothermal hole 21, and may be connected at the upper portion thereof to a cement injection pump CP so as to supply a grout material C containing cement into the geothermal hole 21. The lower portion of the geothermal hole 21 may be filled with the grout material C containing cement.

Particularly, the grout material C containing cement may include a waterproofing agent in order to prevent the heat in the geothermal hole 21 from leaking to the outside of the recovery tubes 240 or the supply tubes 340 when the heat leaks from the upper thermal fusion socket 110 of the recovery header unit 100, which has a large number of connected portions, while the grout material C cures in the geothermal hole 21.

The bentonite tremie tube 600 may be inserted into the geothermal hole 21, and may be connected at the upper portion thereof to a bentonite injection pump BP so as to supply a grout material B containing bentonite into the geothermal hole 21. The upper portion of the geothermal hole 21 may be filled with the grout material B containing bentonite.

In some field circumstances, the cement tremie tube 500 and the bentonite tremie tube 600 may be integrated into a single tube, and one of the grout material B containing bentonite and the grout material C containing cement may be applied for construction of the underground heat exchanger.

Particularly, in the case of the cement material or so-called "high efficient bentonite material" in which bentonite is mixed with an excessive amount of sand in order to increase the thermal conductivity thereof, there is the possibility of unintentional constriction in which the recovery tubes 240 and the supply tubes 340 are deformed inwards in a deep zone due to the high specific gravity of the grout material B or C when the grout material B or C is injected into the geothermal hole 21.

In order to prevent this problem, the hydraulic pressure of the water, which is injected into the geothermal hole 21 through one of the valves Va, mounted on the recovery tubes 240 and the supply tubes 340, prior to injection of the grout material B or C into the geothermal hole 21, is increased to 7-10 kg/cm2 while checking the pressure of the water through a manometer PG, and the increased pressure is maintained until curation of the cement or gelation of the bentonite is completed, thereby preventing unintentional constriction of the recovery tubes 240 and the supply tubes 340.

Although there is a characteristic in that the increased moisture content of the cement or bentonite charged in the geothermal hole 21 causes an increase in thermal conductivity, the interior of the underground heat exchanger 10 becomes dried, thus causing a decrease in thermal conductivity when the interior temperature of the geothermal hole 21 increases due to the cooling operation.

In order to solve this problem, when the cement tremie tube 500 and the bentonite tremie tube 600 are inserted into the geothermal hole 21, an injection water tube wpt connected to an injection pump WP may also be inserted together with the cement tremie tube 500 and the bentonite tremie tube 600.

In some instances, the injection water tube wpt may be inserted before holes in the injection water tube wpt are plugged with mud or water-soluble grease.

The injection pump WP configured to supply injection water may be connected to a water tank (not shown). The injection pump WP may forcibly and continuously inject the water in the water tank (not shown) into the geothermal hole 21 through the injection water tube wpt, and thus the holes wpts in the injection water tube wpt, which are plugged with mud or water-soluble grease, may be gradually opened so as to allow the injection water to be introduced into the geothermal hole 21. Consequently, the high moisture content in the geothermal hole 21 may be persistently maintained, thereby increasing the thermal conductivity of the underground heat exchanger 10.

Alternatively, in place of the injection water tube wpt having formed therein the holes wpts, a tube, which is finely slit in the outer circumferential surface thereof or is wound in a roll fashion, may be applied so as to realize the same function of allowing the grout materials B and C to be supplied into the geothermal hole 21 but not to be introduced into the injection water tube wpt when the interior of the geothermal hole 21 is grouted.

The weight 700 may be composed of a case and a material having a specific gravity higher than metal or cement concrete and charged in the case. The weight 700 is provided at the lower portion of the recovery header unit 100 so as to prevent floatation of the recovery header unit 100.

Accordingly, the weight 700 is capable of preventing floatation of the recovery tubes 240 and the supply tubes 340, which are connected to the recovery header unit 100.

Referring to FIG. 2, the weight 700 may be fixed to the lower portion of the recovery header unit 100 by means of fastening bolts E.

Referring to FIG. 3, the weight 700 may be coupled to the lower portion of the recovery header unit 100 via connecting links F.

Furthermore, the weight 700 may be integrally formed with the lower portion of the recovery header unit 100.

Figure 22:
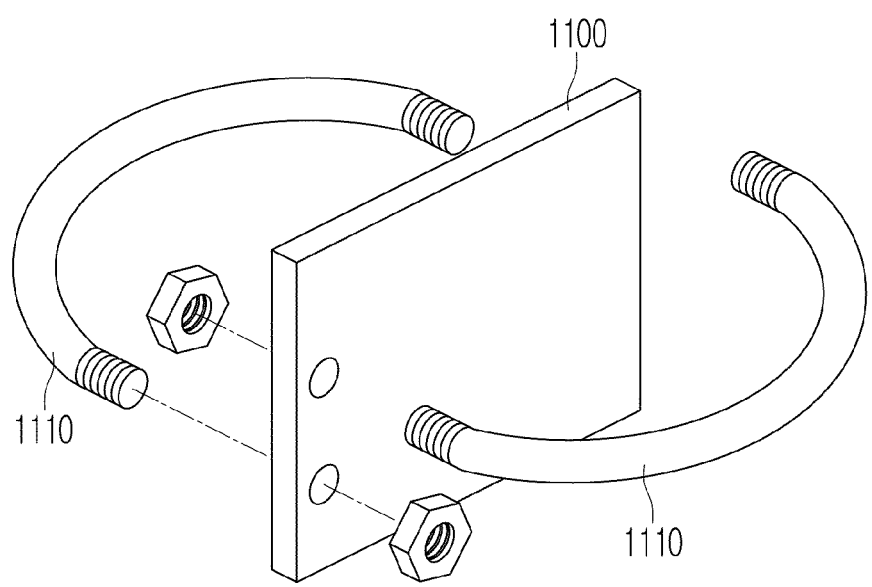
FIG. 22 illustrates a bracket of the geothermal system including the vertical multitubular hermetic underground heat exchanger according to the present invention.

Referring to FIGS. 18 and 22, the vertical multitubular hermetic underground heat exchanger 10 according to the present invention may further include a bracket 1100, disposed between the first and second recovery tubes 240a and 240b and the first and second supply tubes 340a and 340b so as to space the first and second recovery tubes 240a and 240b apart from the first and second supply tubes 340a and 340b, and "U'-shaped bolts 1110 configure to respectively fix the first and second recovery tubes 240a and 240b and the first and second supply tubes 340a and 340b to the bracket 1100.

More specifically, the bracket 1100 may be additionally provided at the upper portion of the recovery header unit 100, and the outer surfaces of the first and second recovery tubes 240a and 240b and the first and second supply tubes 340a and 340b may be fastened and coupled to the bracket 1100 by means of the "U"-shaped bolts 1110 and mating nuts.

The cover 800 may hermetically close the upper portion of the geothermal hole 21 to prevent the entry of foreign substances. The cover 800 may be provided at a side portion thereof with a checking window 810 so as to enable a worker to open the checking window 810 and to check the vertical multitubular hermetic underground heat exchanger 10 through the checking window 400.

Figure 4:
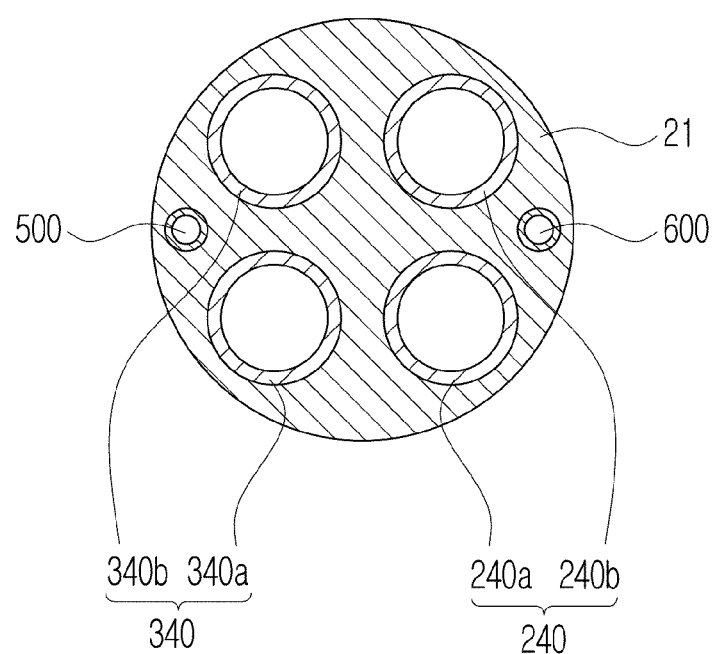
FIG. 4 illustrates recovery tubes and supply tubes of the geothermal system including the vertical multitubular hermetic underground heat exchanger according to the present invention.

Referring to FIG. 4, the recovery tubes may be composed of the first recovery tube 240a and the second recovery tube 240b, and the supply tubes 340 may be composed of the first supply tube 340a and the second supply tube 340b. The first and second recovery tubes 240a and 240b and the first and second supply tubes 340a and 340b may have the same outside diameter and the same inside diameter, and may be spaced apart from one another at regular intervals.

Alternatively, referring to FIG. 5, the recovery tubes 240 may be composed of the first recovery tube 240a and the second recovery tube 240b, and the supply tubes 340 may be composed of the first supply tube 340a and the second supply tube 340b. The first recovery tube 340a may have outside and inside diameters larger than those of the second recovery tube 240b, and the first supply tube 340a may have outside and inside diameters larger than those of the second supply unit 340b. The first recovery tube 240a and the first supply tube 340a may have the same outside and inside diameters, and the second recovery tube 240b and the second supply tube 340b may have the same outside and inside diameters. The first recovery tube 240a may be disposed at a right and lower side, and the second recovery tube 240b may be disposed at a right and upper side. Furthermore, the first supply tube 340a may be disposed at a left and rear side, and the second supply tube 340b may be disposed at a left and front side. As a result, because sufficient space is provided around the second recovery tube 240b and the second supply tube 340b, it is possible to mount the vertical multitubular hermetic underground heat exchanger 10 even when the geothermal hole 21 is formed to have a narrow portion.

Accordingly, because the number of supply tubes 340 and the number of recovery tubes 240 are increased and thus the heat exchange area is increase compared to a conventional underground heat exchanger composed of a single supply tube and a single recovery tube, it is possible to increase the efficiency of heat exchange of the underground heat exchanger 10.

Referring to FIGS. 7 to 10, the vertical multitubular hermetic underground heat exchanger 10 according to the present invention may further include a load bar 900 and a fixing member 1000.

Figure 7:
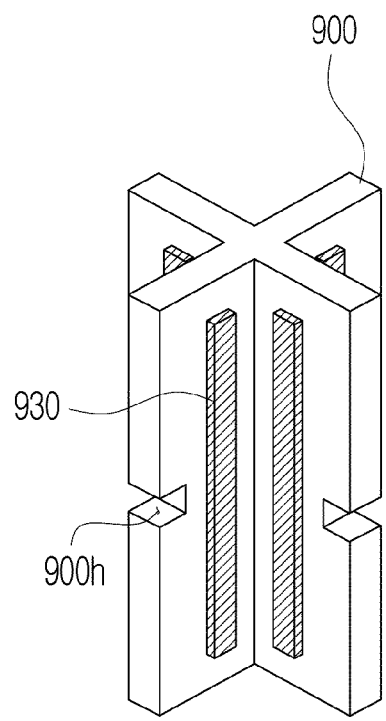
FIG. 7 illustrates a load bar of the geothermal system including the vertical multitubular hermetic underground heat exchanger according to the present invention.
Figure 8:
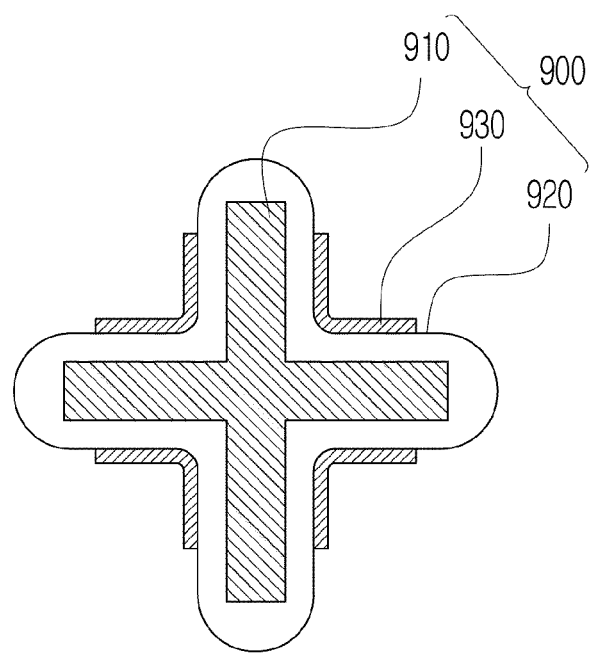
FIG. 8 illustrates the load bar of the geothermal system including the vertical multitubular hermetic underground heat exchanger according to the present invention.

Referring to FIGS. 7 and 8, the load bar 900 may be composed of a metal member 910 having a "+"-shaped cross section and an outer skin 920 made of PE, PVC, rubber, urethane, or the like and enveloping the metal member 910 so as to prevent damage to the first and second recovery tubes 240a and 240b and the first and second supply tubes 340a and 340b due to friction with the outer surface of the metal member 910. The load bar 900 may be disposed between the first and second recovery tubes 240a and 240b and the first and second supply tubes 340a and 340b so as to space the first and second recovery tubes 240a and 240b and the first and second supply tubes 340a and 340b apart from one another.

The load bar 900 may further include adhesive bands 903 configured to attach the load bar 900 to the recovery tubes 240 and the supply tubes 340. The adhesive bands 930 may serve to prevent the recovery tubes 240 and the supply tubes 340 from being separated from the load bar 900 by virtue of the adhesive action therebetween when the recovery tubes 240 and the supply tubes 340 are fixed to the load bar 900 by means of the fixing member 1000.

Furthermore, the load bar 900 may be fixed to the recovery tubes 240 and the supply tubes 340 by means of an additional fixing band (not shown) in a bolt-fastening manner.

Figure 9:
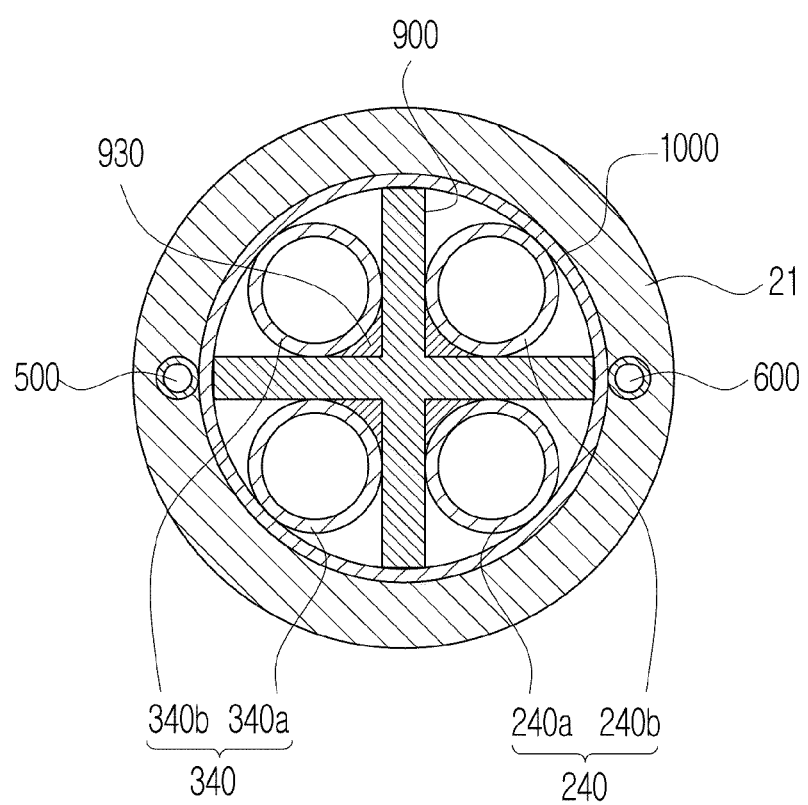
FIG. 9 illustrates the recovery tubes, the supply tubes, the load bar and a fixing band of the geothermal system including the vertical multitubular hermetic underground heat exchanger according to the present invention.
Figure 10:
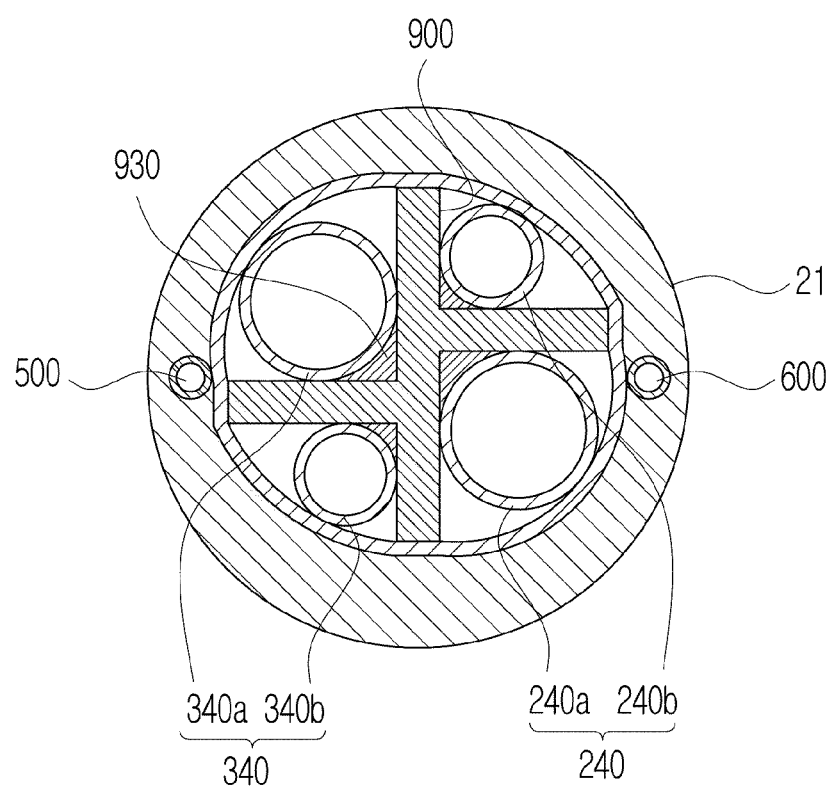
FIG. 10 illustrates the recovery tubes, the supply tubes, the load bar, and the fixing band of the geothermal system including the vertical multitubular hermetic underground heat exchanger according to the present invention.

Referring to FIGS. 9 and 10, the fixing member 1000 may be in contact with the first and second recovery tubes 240a and 240b and the first and second supply tubes 340a and 340b. In other words, the fixing member 1000 may be fitted into grooves 900h formed in side portions of the load bar 900 so as to fix the load bar 900 to the first and second recover tubes 240a and 240b and the first and second supply tubes 340a and 340b.

The fixing member 1000 may be a band made of rubber, urethane, or the like.

Referring to FIG. 9, when the first and second recovery tubes 240a and 240b and the first and second supply tubes 340a and 340b have the same outside diameter and the same inside diameter, the load bar 900 may have a "+"-shaped cross section, and may be disposed between the first and second recovery tubes 240a and 240b and the first and second supply tubes 340 and 340b so as to space the first and second recovery tubes 240a and 240b and the first and second supply tubes 340 and 340b apart from one another and to be fixed to the first and second recovery tubes 240a and 240b and the first and second supply tubes 340 and 340b.

Referring to FIG. 10, when the first recovery tube 240 has outside and inside diameters larger than the second recovery tube 250, the first supply tube 340 has outside and inside diameters larger than second supply tube 350, the first recovery tube 240 and the first supply tube 340 have the same outside diameter and the same inside diameter, and the second recovery tube 250 and the second supply tube 350 have the same outside diameter and the same inside diameter, the load bar 900 may have a "+" shaped cross section which is deformed upwards at a side portion thereof and downwards at the opposite side portion thereof, and may be disposed between the first and second recovery tubes 240a and 240b and the first and second supply tubes 340a and 340b so as to space the first and second recovery tubes 240a and 240b and the first and second supply tubes 340a and 340b apart from one another. The fixing member 1000 may fix the load bar 900 to the first and second recovery tubes 240a and 240b and the first and second supply tubes 340a and 340b.

Accordingly, because the load bar 900 is fixed to the first and second recovery tubes 240a and 240b and the first and second supply tubes 340a and 340b by means of the fixing member 1000, it is possible to prevent floatation of the first and second recovery tubes 240a and 240b and the first and second supply tubes 340a and 340b using not only the weight 700 but also the load bar 900.

Figure 12:
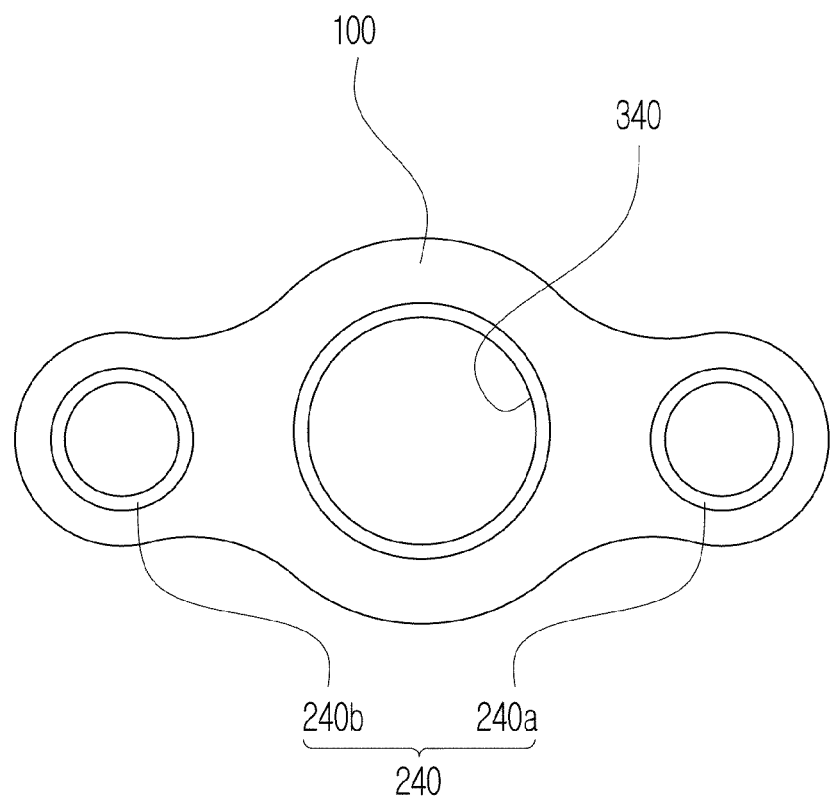
FIG. 12 is a plan view of the recovery tubes and the supply tubes of the geothermal system including the vertical multitubular hermetic underground heat exchanger according to the present invention.
Figure 13:
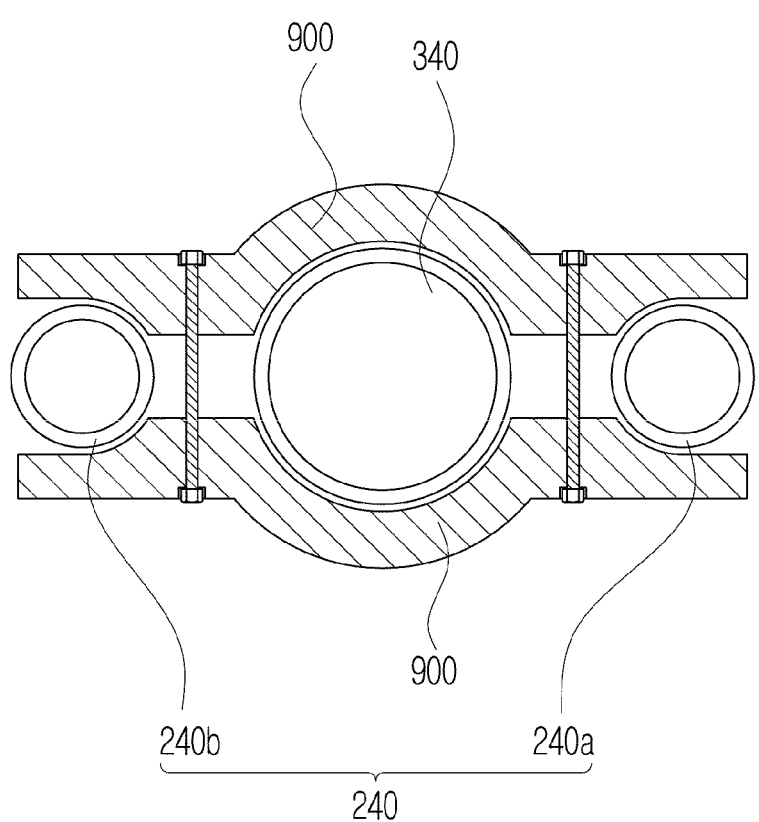
FIG. 13 illustrates the recovery tubes, the supply tubes, the load bar, and the fixing member of the geothermal system including the vertical multitubular hermetic underground heat exchanger according to the present invention.

When the supply tubes 340 of the supply unit 300 are composed of a single supply tube 340 and the recovery tubes 240 of the recovery unit 200 are composed of the first and second recovery tubes 240a and 240b, as illustrated in FIGS. 11 to 13, the load bar 900 may be composed of a pair of plates, which cover the supply tubes 340 and the first and second recovery tubes 240a and 240b, and the fixing member 1000 may be composed of bolts, which are threadedly engaged with the load bar 900 so as to fix the load bar 900 to the supply tubes 340 and the first and second recovery tubes 240a and 240b.

An operation of installing the geothermal system including the vertical multitubular hermetic underground heat exchanger according to the present invention will be described with reference to FIGS. 1, 2, 6, 14, and 16.

As illustrated in FIG. 1, a first operation (S100) of vertically drilling the ground 20 to form the geothermal hole 21 is first performed.

Figure 14:
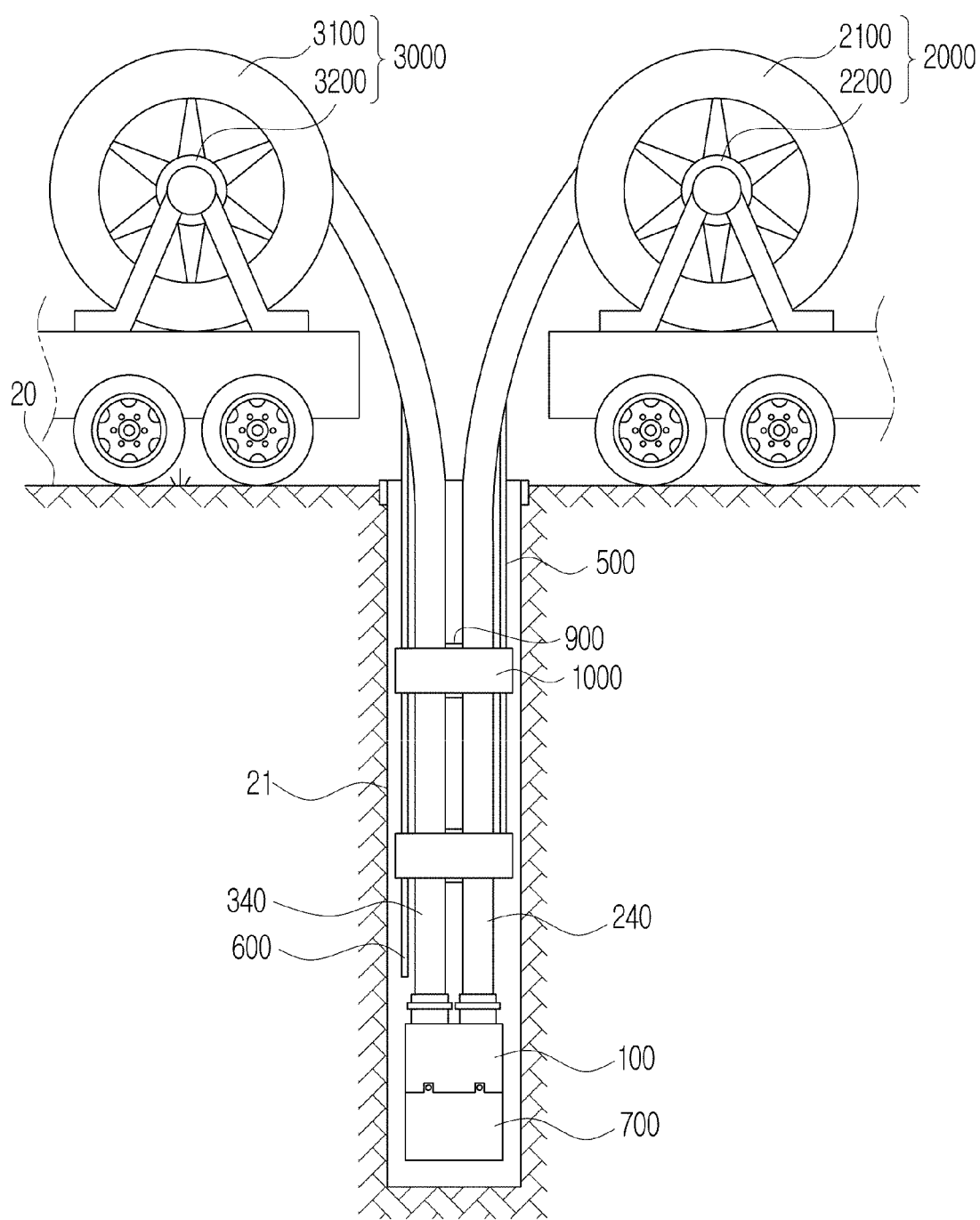
FIG. 14 illustrates an operation of inserting the recovery tubes and the supply tubes of the geothermal system including the vertical multitubular hermetic underground heat exchanger according to the present invention into a geothermal hole.
Figure 15:
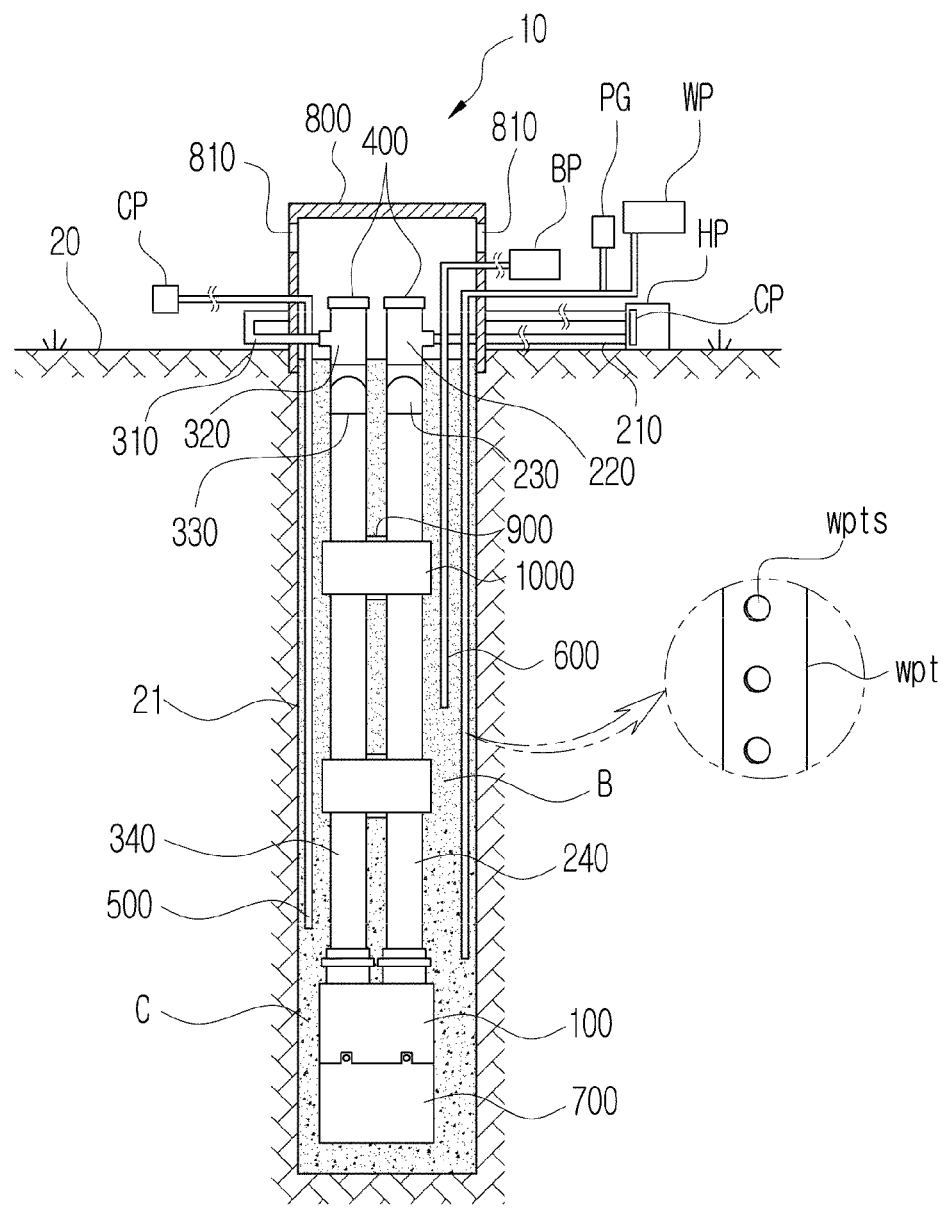
FIG. 15 illustrates the geothermal system including the vertical multitubular hermetic underground heat exchanger according to the present invention.

As illustrated in FIG. 14, a second operation (S200) of disposing two or more recovery tube injectors 2000 and one or more supply tube injectors 3000 on the ground 20 is performed.

Here, each of the recovery tube injectors 2000 may be composed of a recovery roller 2100 around which the recovery tubes 240 are wound and a recovery roller motor 2200 configured to rotate the recovery roller 2100 to thus supply the recovery tubes 240, and the supply tube injector 3000 may be composed of a supply roller 3100 around which the supply tubes 340 are wound and a supply roller motor 3200 configured to rotate the supply roller 3100 to thus supply the supply tubes 340.

The recovery roller motor 2200 and the supply roller motor 3200 may be omitted when an additional hydraulic injection apparatus (not shown) is provided.

Subsequently, as illustrated in FIG. 2, a third operation (S300) of coupling the recovery header unit 100 to the recovery tubes 240 running from the recovery tube injector 2000 and to the supply tubes 340 running from the supply tube injector 3000 is performed.

Subsequently, a fourth operation (S400) of fixing the load bar 900 to the recovery tubes 240 and the supply tubes 340 by means of the fixing member 1000, injecting the recovery tubes 240 into the geothermal hole 21 through the recovery tube injector 2000, injecting the supply tubes 340 into the geothermal hole 21 through the supply tube injector 3000 to position the recovery header unit 100 at the lower portion of the geothermal hole 21, and mounting the cement tremie tube 500 and/or the bentonite tremie tube 600 in the geothermal hole 21 is performed.

In this operation, the cement tremie tube 500 may be omitted.

Figure 16:
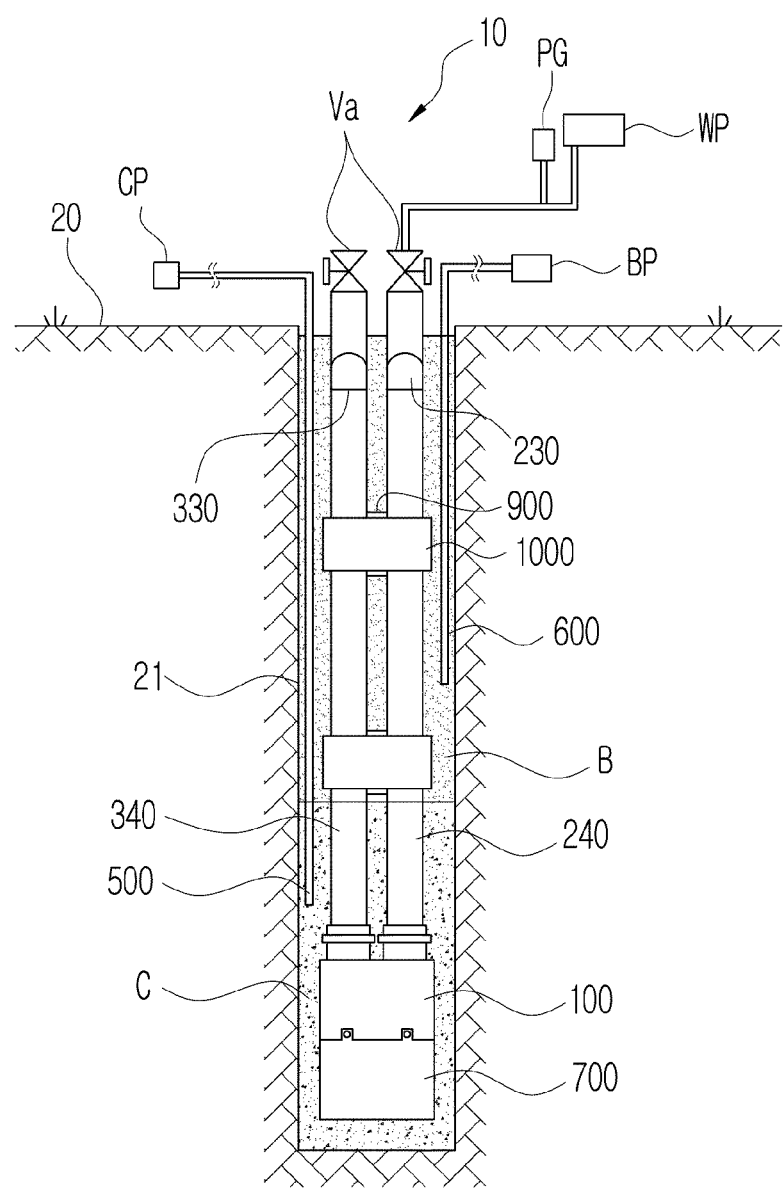
FIG. 16 illustrates an operation of charging clean water into the recovery tubes and the supply tubes through valves in order to prevent constriction of the recovery tubes and the supply tubes during an operation of grouting the geothermal system including the vertical multitubular hermetic underground heat exchanger according to the present invention.

Subsequently, as illustrated in FIG. 16, a fifth operation (S500) of mounting the valves Va to the upper ends of the recovery tubes 240 and the supply tubes 340 and charging clean water into the recovery tubes 240 and the supply tubes 340 through the valves Va to prevent constriction of the recovery tubes 240 and the supply tubes 340 is performed.

Subsequently, a sixth operation (S600) of supplying the grout material C containing cement to the lower portion of the inside of the geothermal hole 21 through the cement tremie tube 500 and supplying the grout material B containing bentonite to the upper portion of the inside of the geothermal hole 21 through the bentonite tremie tube 600 is performed.

The sixth operation may be an operation of supplying the grout material B containing bentonite to the upper portion of the inside of the geothermal hole 21 through the bentonite tremie tube 600 without supplying the grout material C containing cement to the lower portion of the inside of the geothermal hole 21 through the cement tremie tube 500.

Finally, a seventh operation (S700) of removing the valves Va from the recovery tubes 240 and the supply tubes 340 after the grout material C containing cement or the grout material B containing bentonite is cured, connecting the distribution tube 230 to the upper end of the recovery tubes 240 and then connecting the recovery connection tube 220 to the distribution tube 230, as illustrated in FIG. 6, connecting the interflow tube 330 to the upper ends of the supply tubes 340, connecting the supply connection tube 320 to the interflow tube 330, connecting the inflow tube 310 to the supply connection tube 320, and connecting the outflow tube 210 and the inflow tube 310 to the heat pump HP is performed, thereby completing the installation of the geothermal system 1 including the vertical multitubular hermetic underground heat exchanger.

In the seventh operation (S700), the checking units 400 may be respectively mounted in upper portions of the recovery connection tube 220 and the supply connection tube 320.

In the third operation (S300), the weight 700 may be mounted on the lower portion of the recovery header unit 100 so as to prevent floatation of the recovery header unit 100.

The cement tremie tube 500 may be constructed so as to have the same configuration as the bentonite tremie tube 600.

More specifically, in the fourth operation (S400), both the cement tremie tube 500 and the bentonite tremie tube 600 may not be mounted in the geothermal hole 21, only the cement tremie tube 500 may be mounted in the geothermal hole 21, the grout material C containing cement may be supplied to the lower portion of the inside of the geothermal hole 21 through the cement tremie tube 500, and the grout material B containing bentonite may be supplied to the upper portion of the inside of the geothermal hole 21 through the cement tremie tube 500.

Consequently, because the geothermal system 1 including the vertical multitubular hermetic underground heat exchanger according to the present invention has an increased number of supply tubes 340 and the recovery tubes 240 and thus has increased heat exchange area, it is possible to improve the efficiency of heat exchange of the underground heat exchanger.

Furthermore, because the weight 700 is mounted on the lower portion of the recovery header unit 100, it is possible to prevent floatation of the recovery header unit 100, the first and second recovery tubes 240*a* and 40*b* and the first and second supply tubes 340*a* and 340*b*, which are connected to the recovery header unit 100. In addition, because the load bar 900 is disposed between the first and second recovery tubes 240*a* and 240*b* and the first and second supply tubes 340*a* and 340*b* and is fixed to the first and second recovery tubes 240*a* and 240*b* and the first and second supply tubes 340*a* and 340*b* by means of the fixing member 1000, it is also possible to prevent floatation of the first and second recovery tubes 240*a* and 240*b* and the first and second supply tubes 340*a* and 340*b* by means of the load bar 900 and the fixing member 1000.

In addition, because the checking units 400 are respectively mounted on the recovery connection tube 220 and the supply connection tube 320 so as to enable the vertical multitubular hermetic underground heat exchanger 10 to be checked after the vertical multitubular hermetic underground heat exchanger 10 is installed in the geothermal hole 21, it is possible to separately check for accidental spillage at all geothermal holes 21 and to preemptively prevent complete shutdown of a facility due to the accidental spillage.

Although the present invention has been described in detail based on the embodiments, the embodiments are only some of preferred embodiments of the present invention. Accordingly, it should be understood that the present invention is not limited by the embodiments disclosed herein and that the present invention must be construed by the attached claims and equivalents thereof.

The invention claimed is:

1. A geothermal system including a vertical multitubular hermetic underground heat exchanger, comprising:
    a geothermal hole vertically drilled in a ground;
    a heat pump disposed on the ground and including a circulation pump; and
    the vertical multitubular hermetic underground heat exchanger embedded in the geothermal hole and connected to the heat pump so as to supply thermal fluid, having absorbed heat in the geothermal hole, to the heat pump by the circulation pump and to recover the thermal fluid, having exchanged heat in the heat pump, to the geothermal hole, the vertical multitubular hermetic underground heat exchanger including a connection tube and associated components,
    wherein the vertical multitubular hermetic underground heat exchanger comprises:
    a recovery header unit disposed underneath the geothermal hole;
    a recovery unit comprising an outflow tube connected to the heat pump so as to allow the thermal fluid, having exchanged heat in the heat pump, to flow therethrough from the heat pump, a recovery connection tube having openings respectively formed in a lower portion and a side portion thereof and connected at the side portion thereof to the outflow tube, a distribution tube having one opening formed in an upper portion thereof and one or more openings formed in a lower portion thereof and connected at an upper portion thereof to the lower portion of the recovery connection tube, and two or more recovery tubes embedded in the geothermal hole and connected at an upper end thereof to the lower portion of the distribution tube and at a lower end thereof to the recovery header unit such that the thermal fluid outflowing from the outflow tube is recovered to the recovery header unit while absorbing heat;

a supply unit comprising an inflow tube connected to the heat pump, a supply connection tube having openings respectively formed in a lower portion and a side portion thereof and connected at the side portion thereof to the inflow tube, an interflow tube having one opening formed in an upper portion thereof and one or more openings formed in a lower portion thereof and connected at the upper portion thereof to the lower portion of the supply connection tube, and two or more supply tubes embedded in the geothermal hole and connected at an upper end thereof to the lower portion of the interflow tube and at a lower end thereof to the recovery header unit such that the thermal fluid recovered to the recovery header unit is supplied to the heat pump through the interflow tube, the supply connection tube, and the inflow tube while absorbing heat; and a load bar coupled both to the recovery tube and to the supply tube, wherein the recovery header unit has an internal space in which the recovery tubes are respectively connected to the supply tubes such that the thermal fluid recovered through the recovery tubes merges and is distributed to the supply tubes by changing a direction, the internal space being curved at a lower portion thereof such that the thermal fluid recovered from the recovery tubes is smoothly transferred to the supply tubes, and wherein the load bar is fixed to the recovery tubes and the supply tubes by means of a fixing member so as to space the recovery tubes and the supply tubes apart from one another, and includes a metal member therein to prevent floatation of the recovery tubes and the supply tubes.

2. The geothermal system according to claim 1, further comprising:

checking units respectively mounted on upper portions of the recovery connection tube and the supply connection tube each having an opening formed in an upper portion thereof; and a cover configured to hermetically close an upper portion of the geothermal hole to thus prevent entry of foreign substances into the geothermal hole.

3. The geothermal system according to claim 1, wherein the side portion of the recovery connection tube is connected to the inflow tube and the side portion of the supply connection tube is connected to the outflow tube such that a function of the recovery tubes is replaced with a function of the supply tubes.

4. The geothermal system according to claim 1, wherein the recovery header unit comprises an upper header and a lower header, the upper header and the lower header being fused to each other by heat in a butt-welding manner.

5. The geothermal system according to claim 2, wherein the recovery header unit comprises a plurality of sockets disposed in an upper portion of an inside thereof.

6. The geothermal system according to claim 5, wherein each of the sockets is internally provided with a heating wire, and the recovery tubes and the supply tubes are respectively inserted into the plurality of sockets and fused thereto by heat.

7. The geothermal system according to claim 5, wherein each of the plurality of sockets comprises a support protective ring including the heating wire therein and fixedly inserted thereinto, and the recovery tubes and the supply tubes are respectively inserted into the support protective rings and fused thereto by heat.

8. The geothermal system according to claim 2, wherein the recovery header unit comprises a plurality of thermal fusion sockets projecting upwards from an upper portion thereof, and the recovery tubes and the supply tubes are melted at outer circumferential surfaces of lower ends thereof and are fused to the plurality of thermal fusion sockets by heat.

9. The geothermal system according to claim 8, wherein each of the plurality of thermal fusion sockets comprises a support ring fitted thereover so as to prevent deformation of the thermal fusion socket.

10. The geothermal system according to claim 2, wherein the recovery tubes comprise a first recovery tube and a second recovery tube, and the supply tubes comprise a first supply tube and a second supply tube.

11. The geothermal system according to claim 10, wherein the recovery tubes further comprise a converging tube, connected to lower ends of the first recovery tube and the second recovery tube, and a third recovery tube, connected to a lower end of the converging tube and connected at a lower end thereof to the recovery header unit, and wherein the supply tubes further comprise a diverging tube, connected to lower ends of the first supply tube and the second supply tube, and a third supply tube, connected to a lower end of the diverging tube and connected at a lower end thereof to the recovery header unit.

12. The geothermal system according to claim 10, wherein the first and second recovery tubes and the first and second supply tubes have a same outside diameter and a same inside diameter.

13. The geothermal system according to claim 10, wherein the first recovery tube has an outside diameter and an inside diameter greater than an outside diameter and an inside diameter of the second recovery tube, the first supply tube has an outside diameter and an inside diameter greater than an outside diameter and an inside diameter of the second supply tube, the first recovery tube and the first supply tube have a same outside diameter and a same inside diameter, and the second recovery tube and the second supply tube have a same outside diameter and a same inside diameter.

14. The geothermal system according to claim 2, further comprising a weight mounted on a lower portion of the recovery header unit so as to prevent floatation of the recovery header unit.

15. The geothermal system according to claim 2, wherein the load bar is disposed between the recovery tubes and the supply tubes so as to space the recovery tubes and the supply tubes apart from one another, and comprises a metal member included therein, and the fixing member fixes the load bar to the recovery tubes and the supply tubes.

16. The geothermal system according to claim 1, wherein the load bar comprises an adhesive band provided on an outer surface thereof so as to attach the load bar to the recovery tubes and the supply tubes.

17. The geothermal system according to claim 2, wherein each of the supply unit and the recovery unit comprises a marker indicating a direction in which the thermal fluid flows.

18. The geothermal system according to claim 2, further comprising an injection pump connected to a water tank so as to supply water to the geothermal hole.

19. The geothermal system according to claim 1, further comprising:

a cement tremie tube inserted into the geothermal hole and connected at an upper portion thereof to a cement injection pump so as to supply a grout material containing cement to a lower portion of an inside of the geothermal hole; and a bentonite tremie tube inserted into the geothermal hole and connected at an upper portion thereof to a bentonite injection pump so as to supply a grout material containing bentonite to an upper portion of the inside of the geothermal hole, wherein the grout material containing cement comprises a waterproofing agent in order to prevent the thermal fluid from leaking outside the recovery tubes and the supply tubes when the thermal fluid leaks from the recovery header unit.

20. A method of installing the geothermal system including a vertical multitubular hermetic underground heat exchanger according to claim 19, comprising:

a first operation of vertically drilling a ground to form a geothermal hole;

a second operation of disposing two or more recovery tube injectors and two or more supply tube injectors on the ground;

a third operation of coupling the recovery header unit to lower ends of the recovery tubes running from the recovery tube injectors and to lower ends of the supply tubes running from the supply tube injectors;

a fourth operation of fixing the load bar to the recovery tubes and the supply tubes, injecting the recovery tubes into the geothermal hole from the recovery tube injectors while injecting the supply tubes into the geothermal hole from the supply tube injectors in order to dispose the recovery header unit at a lower portion of the geothermal hole, and disposing the cement tremie tube and/or the bentonite tremie tube in the geothermal hole;

a fifth operation of mounting valves on upper ends of the recovery tubes and the supply tubes, and charging clean water into the recovery tubes and the supply tubes through the valves in order to prevent constriction of the recovery tubes and the supply tubes;

a sixth operation of supplying the grout material containing cement to the lower portion of the inside of the geothermal hole through the cement tremie tube and supplying the grout material containing bentonite to the upper portion of the inside of the geothermal hole through the bentonite tremie tube; and a seventh operation of removing the valves from the upper ends of the recovery tubes and the supply tubes, connecting the distribution tube to the upper ends of the recovery tubes, connecting the recovery connection tube to the distribution tube, connecting the outflow tube to the recovery connection tube, connecting the interflow tube to the upper ends of the supply tubes, connecting the supply connection tube to the interflow tube, connecting the inflow tube to the supply connection tube, and connecting the outflow tube and the inflow tube to the heat pump.

21. The method according to claim 20, wherein the seventh operation comprises mounting checking units on upper portions of the recovery connection tube and the supply connection tube.

22. The method according to claim 20, wherein the third operation comprises mounting a weight to a lower portion of the recovery header unit in order to prevent floatation of the recovery header unit.

23. The method according to claim 20, wherein the cement tremie tube and the bentonite tremie tube are constructed so as to have a same configuration, and wherein the sixth operation comprises supplying the grout material containing cement to the lower portion of the inside of the geothermal hole through the cement tremie tube and supplying the grout material containing bentonite to the upper portion of the inside of the geothermal hole through the cement tremie tube.

\* \* \* \* \*